United States Patent
Yerli et al.

(10) Patent No.: US 11,798,119 B2
(45) Date of Patent: Oct. 24, 2023

(54) MULTI-DIMENSIONAL 3D ENGINE COMPUTING AND VIRTUALIZATION-BASED DYNAMIC LOAD BALANCING OF VIRTUAL OR REAL WORLDS

(71) Applicant: TMRW Foundation IP S. À R.L., Luxembourg (LU)

(72) Inventors: Cevat Yerli, Frankfurt am Main (DE); Prashanth Hirematada, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 17/138,680

(22) Filed: Dec. 30, 2020

(65) Prior Publication Data
US 2021/0201437 A1 Jul. 1, 2021

Related U.S. Application Data

(60) Provisional application No. 62/955,247, filed on Dec. 30, 2019.

(51) Int. Cl.
*G06T 1/20* (2006.01)
*G06T 1/60* (2006.01)
(Continued)

(52) U.S. Cl.
CPC .................. *G06T 1/20* (2013.01); *G06T 1/60* (2013.01); *G06T 17/005* (2013.01); *H04L 67/01* (2022.05); *H04L 67/10* (2013.01); *G06T 2210/36* (2013.01)

(58) Field of Classification Search
CPC . H04L 67/01; H04L 67/10; G06T 1/20; G06T 1/60; G06T 17/005; G06T 2210/36
USPC ......................................................... 345/419
See application file for complete search history.

(56) References Cited

U.S. PATENT DOCUMENTS 7,702,784 B2 4/2010 Berstis et al.
8,572,207 B2 10/2013 Shuster et al.
(Continued)

FOREIGN PATENT DOCUMENTS

JP H0877365 A 3/1996
JP H0877387 A 3/1996
(Continued)

OTHER PUBLICATIONS

Ali, A.E.E., et al., "An allocation management algorithm for DVE system," Computer Engineering & Systems International Conference, Piscataway, NJ, USA, Dec. 14, 2009, pp. 489-494.
(Continued)

*Primary Examiner* — Jacinta M Crawford
(74) *Attorney, Agent, or Firm* — Bryan Cave Leighton Paisner LLP.

(57) ABSTRACT

A system enabling a distributed 3D engine for performing dynamic load balancing through virtual worlds are provided. The system comprises one or more server computers comprising memory and at least one processor, the memory storing a data structure representing at least one portion of a virtual or real world as a plurality of cells storing virtual objects. The memory further stores a distributed 3D engine comprising a resource manager implemented in a distributed deployment and a plurality of individual software engines. Resources are dynamically allocated via the distributed deployment to one or more cells based on a current load and a corresponding computed and ranked demand. In some embodiments, the demand further considers one or more of an amount of virtual objects and level of interactions within the portion of the persistent virtual world system visible to a user avatar. Methods thereof are also provided.

19 Claims, 15 Drawing Sheets

(51) Int. Cl.
*H04L 67/10* (2022.01)
*G06T 17/00* (2006.01)
*H04L 67/01* (2022.01)

(56) References Cited

U.S. PATENT DOCUMENTS

| | | | |
|---|---|---|---|
| 8,751,668 | B2 | 6/2014 | Kulkarni et al. |
| 8,933,939 | B2* | 1/2015 | Li .................. G06T 19/003 |
| | | | 345/473 |
| 9,498,711 | B2 | 11/2016 | Assa |
| 10,003,640 | B2 | 6/2018 | Bhogal et al. |
| 2010/0113158 | A1 | 5/2010 | Chapman et al. |
| 2010/0113159 | A1 | 5/2010 | Chapman et al. |
| 2015/0321101 | A1* | 11/2015 | Rosedale ............. A63F 13/54 |
| | | | 463/30 |
| 2017/0347120 | A1* | 11/2017 | Chou ................. H04N 19/86 |
| 2018/0060138 | A1 | 3/2018 | Whitehead et al. |
| 2019/0176037 | A1 | 6/2019 | Leung et al. |

FOREIGN PATENT DOCUMENTS

| | | |
|---|---|---|
| JP | 2003271985 A | 9/2003 |
| JP | 2004348702 A | 12/2004 |
| JP | 2009187115 A | 8/2009 |
| JP | 2015087892 A | 5/2015 |
| JP | 2018032112 A | 3/2018 |
| WO | 2019/207104 A1 | 10/2019 |

OTHER PUBLICATIONS

Bouras, C., et al., "Performance improvement of Distributed Virtual Environments by exploiting objects' attributes", Virtual Reality, vol. 16, No. 3, Aug. 23, 2011, pp. 187-203.

Extended European Search Report dated May 7, 2021, issued in corresponding European Application No. EP20217104, 11 pages.

Tanin, E., et al., "A Serverless 3D World," Proceedings of the 12th Annual ACM International Workshop on Geographic Information Systems, Washington, D.C., Nov. 2004, 9 pages.

Fiedler, S., et al., "A Communication Architecture for Massive Multiplayer Games," NetGames '02: Proceedings of the 1st Workshop on Network and System Support for Games, Braunschweig, Germany, Apr. 2002, 9 pages.

Mullender, S.J., et al., "Amoeba A Distributed Operating System for the 1990s" Computer: 23(5) pp. 44-53, May 1990.

Munro, J., et al., "Architectural Studies of Games Engines—the Quake Series," 2009 International IEEE Consumer Electronics Society's Games Innovations Conference, London, UK, Aug. 25-28, 2009, pp. 1-10.

Kazem, I., et al., "A Visibiltiy-Driven Approach to Managing Interest in Distributed Simulations with Dynamic Load Balancing," 11th IEEE International Symposium on Distributed Simulation and Real-Time Applications (DS-RT'07), Chania, Greece, Oct. 22-26, 2007, 8 pages.

Hildebrand, D., "An Architectural Overview of QNX," Proceedings of the Usenix Workshop on Micro-Kernels & Other Kernel Architectures, Seattle, WA, Apr. 1992, pp. 1-16.

Maggiorini, D., et al., "SMASH: a Distributed Game Engine Architecture," 2016 IEEE Symposium on Computers and Communication (ISCC), Messina, Italy, Jun. 27-30, 2016, 6 pages.

Office Action dated Sep. 20, 2022, in Japanese application No. 2020-214349 (Japanese version), 21 pages.

Office Action dated Oct. 1, 2021, in Indian application No. 202014056483, filed Dec. 25, 2020, 7 pages.

Office Action dated Mar. 8, 2022, in Japanese application No. 2020214349 (Japanese version), 11 pages.

* cited by examiner

MULTI-DIMENSIONAL 3D ENGINE COMPUTING AND VIRTUALIZATION-BASED DYNAMIC LOAD BALANCING OF VIRTUAL OR REAL WORLDS

CROSS-REFERENCE TO RELATED APPLICATION

This application claims the benefit of U.S. Provisional Application No. 62/955247, filed on Dec. 30, 2019, which is incorporated herein by reference.

BACKGROUND

Conventional systems designed to run virtual worlds and, especially, massively multiplayer online games (MMOGs) are limited in the way they scale to support very large numbers of players or entities within the virtual worlds. As these virtual worlds are usually run on a single physical computer and are reliant on a single instance of the game or application, the virtual worlds are thus supported by the limited bandwidth of the system and the processor capacity of a server hosting the virtual world. The server, hosting a game or simulation engine, is required to provide the simulation capabilities for every object and player in the virtual world. However, as the number of players and entities increases, resource requirements increase as well, decreasing the quality of service (QOS) and user experience within the virtual world.

Other approaches include splitting and evenly distributing a map and running a part of the map on multiple servers, each server having responsibility for their corresponding part of the map. Although more resources are available to provision the entire map, this method still presents some drawbacks. For example, crowding of one zone can make this type of geographic partitioning inefficient for use in virtual worlds, and migration from one zone to another can offer discrete view to users crossing the zones as opposed to continuous one because of the required server switching.

In addition, current 3D engines used in the development and processing of virtual worlds have a number of drawbacks that limit the capabilities of provisioning of virtual worlds. For example, typical current 3D engines tend to be monolithic, may be centralized and difficult to scale upwards, and may be platform-dependent. This hinders the possibility to fully exploit the capabilities of each of the specific modules of 3D engines during development and execution of a virtual world, further adding to aforementioned drawbacks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems and methods, and more specifically to a system and method enabling a multi-dimensional 3D engine computing and virtualization-based dynamic load balancing of virtual or real worlds.

A system of the current disclosure comprises one or more server computers comprising memory and at least one processor, the memory storing a data structure virtualizing at least one portion of a virtual or real world into a plurality of cells storing virtual objects forming a persistent virtual world system. In some embodiments, at least some of the virtual objects are virtual replicas of corresponding real world elements. The memory further stores a distributed 3D engine implemented in a distributed deployment, the distributed 3D engine comprising a resource manager and a plurality of individual distributed software engines. Resources are dynamically allocated via the distributed deployment to one or more cells based on a current load and a corresponding computed and ranked demand of the one or more cells. In some embodiments, the demand is based at least in part on an amount of virtual objects within the one or more cells or a level of interactions within a portion of the persistent virtual world system visible to a user avatar within the one or more cells, or a combination thereof. In some embodiments, the resources comprise computing power, memory, network resources (e.g., bandwidth), or combinations thereof.

In further embodiments, the demand is further based on the distances between user devices accessing the one or more cells and network equipment (e.g., servers and network antennas), the type of application being used by users, or the type of entitlements that a user accessing the one or more cells may have, e.g., depending on his individual user profile or contract details, or combinations thereof.

In some embodiments, the virtual objects further comprise purely virtual objects not available in the real world, virtual avatars of real people, and applications.

In some embodiments, the persistent virtual world system comprises a plurality of simulations of the same virtual or real world, the simulations varying from high to low fidelity, wherein a low fidelity simulation is used for demand assessment and load balancing, and wherein a high fidelity simulation is used for improving user experience. This enables different simulations to be performed depending on the case and situation. LOD management allows also to provide an optimized user experience, depending on the specific requirements and context. Therefore, the same virtual or real world can be simulated at different LOD to facilitate the load balancing methods of the current disclosure while providing a suitable experience to users.

In some embodiments, the virtual objects of the persistent virtual world system comprise data and models, which refer to any graphical, mathematical or logical representation of aspects of the virtual or corresponding real objects. In some embodiments, data and models provide the entities of the persistent virtual world system with self-computing capabilities and autonomous behavior. In some embodiments, suitable models comprise one or more of a 3D model, geometric model, dynamic model, and machine learning model. The virtual objects may be fed with data obtained from simulations, input by users through user devices, or captured by sensor devices (e.g., for persistent virtual world systems based off a real world), such as by Internet of Things devices. The continuous flow of data can maintain the persistent virtual world system periodically updated.

In some embodiments, the persistent virtual world system may comprise a virtual world layer that may be separated into an augmented reality (AR) layer and virtual reality (VR) layer. The separate layers may enable accessing the persistent virtual world system in any of augmented or virtual reality and combining elements stored in each layer, and may be activated through client devices connected the at least one server computer through the network whenever accessing one or the other type of reality. Each of the layers may comprise augmentations of reality and virtual objects that may be specific to each layer.

In some embodiments, the individual distributed software engines may be distributed 3D engines decomposed into a plurality of dynamic and independent software modules that may communicate with each other when configured locally, or with individual software modules located remotely. In some embodiments, a plurality of distributed software engines can be used in parallel or sequentially within the network to create synergies with each other. For example, a plurality of 3D graphics engines hosted at the same or different server computers may allocate engine services sequentially or in parallel, through the distributed message exchange platform, in order to complement the engine services of each other for the realization of one or more specific tasks.

In some embodiments, the one or more processors are special purpose processing units, general purpose processing units, or combinations thereof, configured to process, in hardware, tasks from corresponding individual distributed software engines. In an embodiment, contrary to typical systems that may employ one or more of standard central processing units (CPUs), graphics processing units (GPUs), the special purpose hardware engines are each tailored specifically for processing of individual distributed software engines to be used in processing of at least one of 3D graphics, artificial intelligence operations, physics operations, 3D structures processing operations, simulation operations, tracking and positioning, and communications, amongst others. In some embodiments, each hardware engine may be coupled as a chip or system on an electronic chip comprising one or more specific hardware processing cores designated for processing each specific type of operation. The processing cores of the one or more electronic chips may be regarded as functional units or modules of the electronic circuits of the electronic chip designed for physically executing required algorithms of each 3D engine. For example, at least one of the one or more processing cores may be realized as an FPGA or any other form of an integrating circuit implementing a dedicated functionality. Accordingly, the electronic chip includes at least one integrated circuit realizing at least some of the one or more processing cores, wherein at least one of the processing cores implements the different special-purpose hardware engines. These electronic chips may be installed, for example, on any or both of the one or more external servers or main servers. In some embodiments, the electronic chips may additionally comprise general-purpose processing cores, such as CPUs and/or GPUs, or may connect to external CPUs and/or GPUs for providing them with additional support for each engine task. Providing special-purpose hardware engines on each of the sources and configuring each of the 3D engine modules in a distributed and independent manner can provide further resources to the system as a whole, in addition to enabling each 3D engine module to have one or more dedicated hardware cores from the one or more hardware engines.

In some embodiments, the data structure representing the virtual or real world into cells is an octree data structure, wherein each cell is represented as a voxel within the octree data structure. In some embodiments, the voxels utilized in the octree data structure are sparse voxels for use in the arrangement of larger portions of the real world. In other embodiments, the voxels utilized in the octree data structure are dense voxels for use in the arrangement of smaller portions of the real world. Octrees and the selected sparse or dense voxels are suitable data structures for representing three-dimensional space in virtual worlds, such as in the persistent virtual world system representing the real world. Octrees enable a fast and easy combination of a plurality of objects, implement relatively simple rendering algorithms, enable performing quick spatial searches, and enable a model generation through virtualization of real objects (e.g., through LIDAR or other image scanning methods). For a virtual world comprising a 3D virtual world representing at least one portion of the real world, such a 3D partition of the world enables a three-dimensionally-based engine service and cloud resource allocation on the areas where a user may be looking and/or interacting.

In some embodiments, cells representing higher resource-intensive areas of interest from the at least one portion of the world are further partitioned into a greater number of cells. In further embodiments, each high-resource-intensive cell is accordingly assigned with resources from one or more sources, wherein smaller cells are allocated a greater amount of resources. In yet a further embodiment, after ending an event associated with one or more requests, the resources are restored to the original one or more sources from the plurality of sources. Subsequently, the at least one portion of the world is consolidated back into the original number of cells. This way, the system achieves an efficient and dynamic allocation of resources by selecting the areas of interest with higher demand.

In some embodiments, the resource manager performs the allocation through a distributed message exchange platform. In further embodiments, the distributed message exchange platform utilizes a publish-subscribe model, wherein the one or more virtual objects subscribe to one or more cells where resources are published. In yet a further embodiment, the distributed message exchange platform shares the dynamically updated state of the at least one portion of the world stored in the memory with one or more of client devices and servers. Thus, the resource manager of the distributed 3D engine of the current disclosure publishes each resource to the distributed message exchange platform once and is delivered to each virtual object that needs them by subscribing to the cells with the published resources. This contrasts with typical 3D engine systems tailored for provisioning virtual worlds, which output a complete data update packet for each client device within a map, tailoring each packet for the client device so that the client device receives only data that may be relevant to the client device and for objects within sight, leading the game or simulation engines to potentially send the same data multiple times once for each client device to which the object may be visible.

According to an embodiment, the state of the at least one portion of the world is further updated through a plurality of connected devices including sensors providing sensor data to the persistent virtual world system. The connected devices may be, for example, Internet of Things (IoT) devices that may communicate to each other and to the servers through a network, and may continuously capture multi-source sensor data from the real world in order to update the virtual replicas of the persistent virtual world system. Thus, the state-updates may result from the sensor data. However, state updates may also result from user input, or from computations (e.g., artificial intelligence inferences) from the one or more 3D engines. The state-updates of the world may then be published on the distributed message exchange platform for all client devices and sources to subscribe and view on demand.

In some embodiments, each cell of the plurality of cells comprises one or more streams, each stream comprising a one or more of stream-specific virtual objects and being configured to be enabled or disabled for viewing and interacting with on the client devices. In yet further embodiments, each stream is associated to one or more user applications. Each stream may be configured to obtain data from the corresponding virtual objects and to perform theme and/or goal-specific simulations. Each stream may connect to a root node or root simulation object that spawns a plurality of stream-related virtual objects. The stream may additionally connect to an import function that defines the virtual replicas that the stream needs to perform the simulations. In some embodiments, a plurality of streams comprising the totality or majority of virtual replicas in a pre-determined environment, such as in a cell or plurality of cells, their context, and the relationships and interactions between each virtual replica forms a universe or sub-universe. A network of sub-universes may form a universe of a persistent virtual world system. For example a sub-universe for a city may be referred to as a city-verse, which may represent all of the buildings, trees, people, streets, traffic lights, vehicles, etc., of a city and their relationships, interactions and context. There may also be a sub-universe within another sub-universe, such as a house-verse within a city-verse. A house-verse may include the 3D design of the exterior and interior of the house, all the appliances, people, walls, energy consumption data, etc., of a house. A network of all sub-universes may form a universe of a persistent virtual world system that may be viewed in virtual or augmented reality. Each of these sub-universes may be dynamically partitioned into a plurality of cells where resources are dynamically allocated.

In embodiments of the current disclosure, the system may be implemented in a cloud to edge infrastructure that may display distributed computing capabilities, comprising employing public or private clouds, fog servers, peer-to-peer cloud server systems, distributed ledger-based infrastructure, cloudlets and edge systems, such as enterprise systems, mobile platforms, and user devices. The distributed ledger-based infrastructure may be a decentralized and immutable blockchain or distributed ledger network that facilitates the transfer and storage of data necessary to widely distribute the persistent virtual world system, including virtual replicas, pure virtual objects, applications, and any event or interaction within the persistent virtual world system. Through the cloud to edge infrastructure, resources including physical servers and network equipment enable a shared storage and computing that may allow for a dynamic allocation thereof depending on factors such as the distance of the user to the resources and the network and computational demand from the users relative to each other and to the locational positions they are, commanding more or less compute accordingly. In some embodiments, the dynamic allocation of resources is codified into smart contracts using the distributed ledger infrastructure, automatizing the transactional logic (e.g., the computer logic behind each allocation of storage and computing) and the consequences or results of such allocation.

According to an embodiment, a method enabling a distributed 3D engine for performing dynamic load balancing through virtual worlds comprises virtualizing, in the memory of at least one server computer, a data structure representing at least one portion of a virtual or real world into a plurality of cells storing virtual objects forming a persistent virtual world system, wherein at least some of the virtual objects are virtual replicas of corresponding real world elements. The method continues by providing, in the memory of the at least one server computer, a distributed 3D engine implemented in a distributed deployment, the distributed 3D engine comprising a resource manager and a plurality of individual distributed software engines. Subsequently, the method continues by computing, by the resource manager based on a current load, the demand of individual ones of the plurality of cells, wherein said demand is based at least in part on an amount of virtual objects within the individual cells or a level of interactions within a portion of the persistent virtual world system visible to a user avatar within the individual cells. Then, the method continues by ranking the individual cells by demand Finally, based on the ranked demand, the method ends by dynamically allocating resources to the individual cells (e.g., one or more higher resource-intensive cells).

According to an embodiment, the method further comprises, based on the computed demand, partitioning areas of interest of the at least one portion of the virtual or real world into additional cells; and assigning corresponding resources to the additional cells (e.g., each cell representing a resource-intensive area of interest). In an embodiment, the method further comprises, after ending an event associated to one or more requests within the higher resource-intensive areas of interest, restoring the resources to the original one or more sources; and consolidating the at least one portion of the world within the persistent virtual world system back into the original number of cells.

In some embodiments, said allocation is performed by publishing resources to the corresponding cells through a distributed message exchange platform of the resource manager using a publish-subscribe model; and subscribing, by the one or more virtual objects, to the cells of interest in order to obtain required resources.

In some embodiments, the method further comprises sharing, through the distributed message exchange platform, the dynamically updated state of the at least one portion of the world with the one or more client devices and/or server computers to which said client devices and/or server computers have subscribed to in order to obtain an updated version of the world. In yet a further embodiment, the state of the at least one portion of the world is obtained by a plurality of connected devices including sensors providing sensor data to the persistent virtual world system, by user input, by server computations, or combinations thereof.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
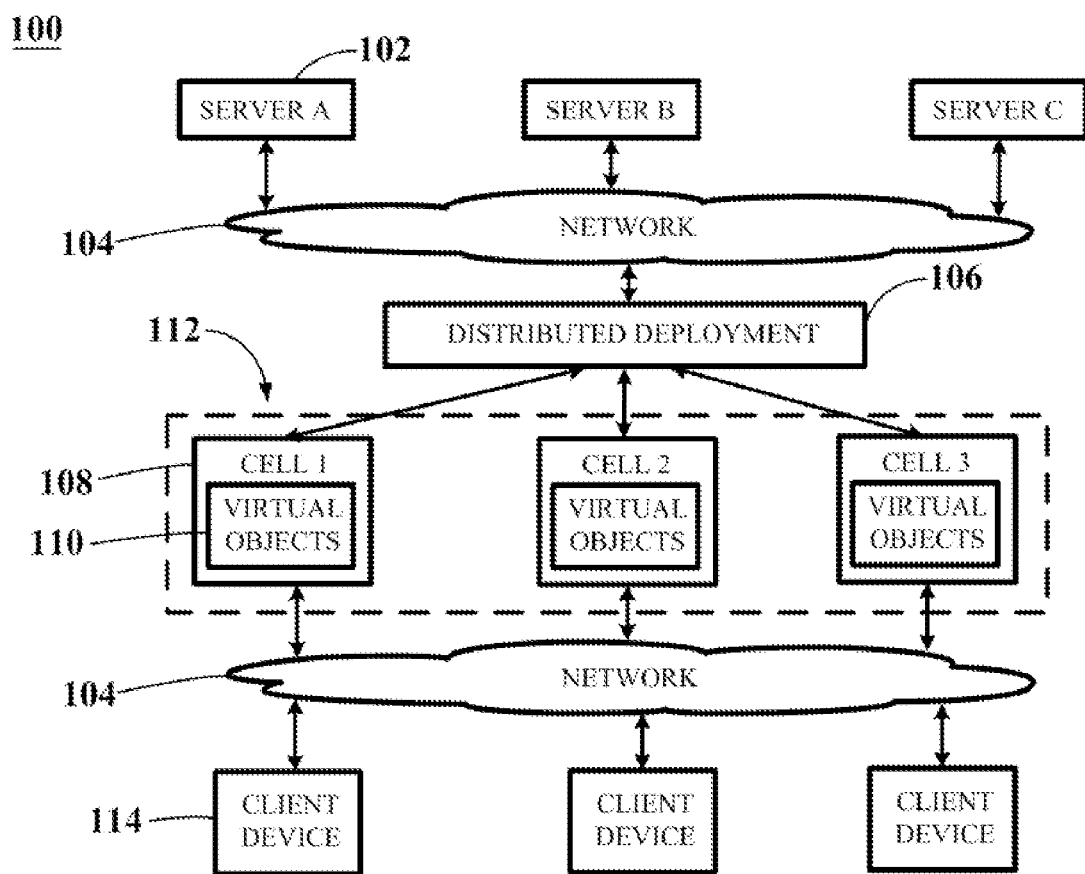
FIG. 1 depicts a schematic representation of system enabling a multi-dimensional 3D engine computing and virtualization-based dynamic load balancing of virtual or real worlds, according to an embodiment.

FIG. 1 depicts a schematic representation of system 100 enabling a multi-dimensional 3D engine computing and virtualization-based dynamic load balancing of virtual or real worlds, according to an embodiment.

System 100 comprises a plurality of server computers 102 (e.g., external servers A-C) implementing through a network 104 a distributed 3D engine comprising a resource manager in a distributed deployment 106. The distributed deployment 106 is an implementation in software of the distributed 3D engine in a plurality of server computers 102 by using a distributed architecture such as the one of system 100. The server computers 102 dynamically allocate resources through the resource manager using a publish-subscribe model, to one or more of a plurality of cells 108 (e.g., cells 1-3), each cell 108 virtually representing one or more different areas of a real world or virtual world. The allocation is based on a current load and a corresponding computed and ranked demand. In some embodiments, the demand further considers one or more of an amount of virtual objects 110 and level of interactions within the portion of the persistent virtual world system visible to a user avatar, as described in further detail below.

One or more of the plurality of cells 108 comprise virtual objects 110, and a plurality of those virtual objects 110 within the cells 108 form a persistent virtual world system 112. In some embodiments, at least some of the virtual objects 110 are virtual replicas of corresponding real world elements. In some embodiments, the demand of individual cells takes into account the amount of virtual objects 110 in the individual cells, level of interactions within the portion of the persistent virtual world system visible to a user through a respective client device 114, or combinations thereof, as described in further detail below. In further embodiments, the requests take into account other parameters such as the distance between client devices 114 and network equipment such as servers and/or antennas, the type of application being used by users, or the type of entitlements that a user may have depending on his individual user profile or contract details, as described in further detail below.

In the current disclosure, the term "persistent" is used to characterize a state of a system that can continue to exist without a continuously executing process or network connection. For example, the term "persistent" may be used to characterize the virtual world system where the virtual world system and all of the objects therein comprised continue to exist after the processes used for creating the virtual objects cease, and independent of users being connected to the virtual world system. Thus, the virtual world system is saved in a non-volatile storage location (e.g., in a server). In this way, virtual replicas, purely virtual objects and applications may interact and collaborate with each other when being configured for accomplishing specific goals even if users are not connected to the server.

In some embodiments, in order to reduce hardware and network demands, contribute to the reduction of network latency, and improve the general merged reality experience, the system may connect through a network 104 including millimeter-wave (mmW) or combinations of mmW and sub 6 GHz communication systems, such as through 5th generation wireless systems communication (5G). In other embodiments, the system may connect through wireless local area networking (Wi-Fi). Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers to satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments of the current disclosure, system 100 may be implemented in a cloud-to-edge infrastructure that may display distributed computing capabilities employing computing devices and systems such as public or private clouds, fog servers, cloudlets, peer-to-peer cloud server systems, distributed ledger-based infrastructure, and edge devices and systems, such as enterprise systems, mobile platforms, and user devices, all of which may connect through the network 104. Using a cloud to edge computing network, access to computing power, computer infrastructure (e.g., through so-called infrastructure as a service, or IaaS), applications, and business processes can be delivered as a service to users via client devices 114 on demand. This way, resources including physical servers and network equipment enable a shared storage and computing that may be dynamically allocated. In some embodiments, the client devices 114 comprise user devices and other devices. The user devices may comprise, for example, mobile devices, personal computers, game consoles, media centers, head-mounted displays, and see-through devices (e.g., digital reality contact lenses). The other devices may be configured specifically to capture multi-source sensor data from real world objects via sensor mechanisms in order to update and enrich the virtual replicas of corresponding real-world objects. According to an embodiment, the other devices are one or more surveillance cameras, vehicles, traffic lights, buildings, streets, train-tracks, home appliances, and the like.

Figure 2:
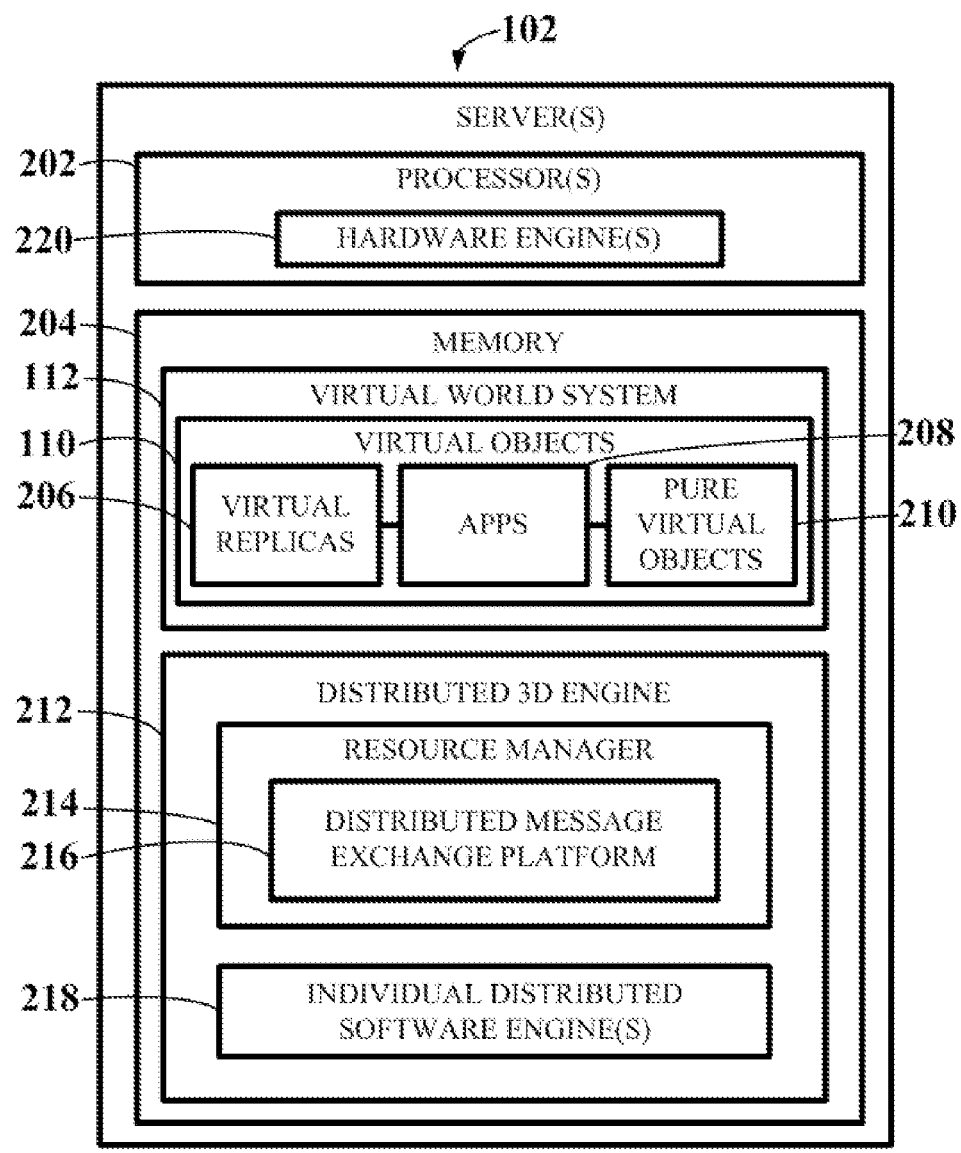
FIG. 2 depicts a schematic representation of server of the system enabling a multi-dimensional 3D engine computing and virtualization-based dynamic load balancing of virtual or real worlds, according to an embodiment.

FIG. 2 depicts a schematic representation of a server 102 of the system 100 enabling a multi-dimensional 3D engine computing and virtualization-based dynamic load balancing of virtual or real worlds, according to an embodiment.

The one or more servers 102 comprise one or more processors 202 and memory 204 storing a data structure virtualizing at least one portion of a virtual or real world as a plurality of cells (e.g., cells 108 of FIG. 1), each cell comprising virtual objects 110, forming a persistent virtual world system 112. In embodiments where the persistent virtual world system 112 is based on the real world, some of the virtual objects 110 are virtual replicas 206 of corresponding real world elements. In other embodiments, the virtual objects 110 further comprise applications 208 and pure virtual objects 210 not existing in the real world. The memory 204 further stores a distributed 3D engine 212 comprising a resource manager 214 managing resources. The resource manager 214 utilizes a distributed message exchange platform 216 using a publish-subscribe model to allocate resources comprising computing power, memory and network by publishing the resources on one or more cells where virtual objects may subscribe. The resource manager 214 may function as a virtual layer interfacing hardware and software components managing the resources. The management actions may comprise assessment, provisioning, scaling, and replication of the resources through the distributed message exchange platform 216.

In the current disclosure, the term "virtual replica" refers to accurate and persistent virtual representations of real-world elements. In an embodiment, virtual replicas 206 of the current disclosure refer to a virtual version, or virtual twin, of a real-world element, or real twin, which may either be mapped or modeled through computer assisted drawing (CAD) or computer-assisted engineering (CAE) methods, input by computer models of the real objects (e.g., building information models—BIMs) or other suitable prior art methods, and which may mirror not just the appearance but also the behavior of the real twin. Some of the real-world objects may additionally include sensors that can provide the virtual replicas 206 with multi-source input data for enriching and synchronizing the virtual replicas 206 with their respective real counterpart.

In some embodiments, a virtual replicas 206 include one or more of 3D world and building data, such as SLAM or derivate-mapping based data; 3D geometry data; 3D point cloud data; or geographic information system data representing real-world structural properties that may serve to model a 3D structure for applications.

In the current disclosure, the term "virtualization" refers to the act of creating an abstracted virtual version, or persistent virtual world system 112, of at least one portion of a virtual or real world. For the case of a real world, virtualization refers to creating a virtual version of elements found in the real world, as well as of any resources of the real world (e.g., computing power, memory or network) and the related equipment, enabling users (e.g. human users, computer programs or machines) to interact with elements of the real world through the persistent virtual world system 112. In this way, users can feel as if the interactions took place directly with elements of the real world. For example, a human user can interact, in augmented or virtual reality through user interfaces of a user device (e.g., a mobile phone or head-mounted display device), with elements of a real city through a virtual city, where a plurality of elements of the real city have been virtualized in the persistent virtual world system 112. For physical manipulations of the real world through the virtual replicas, electromechanical devices may be installed on the real world objects in order to translate the remote commands sent through the virtual replica to the real world object into physical actions from the real world elements. Regardless of the persistent virtual world system 112 being based on a virtual or real world, the virtual objects may further comprise models, which refer to any graphical, mathematical or logical representation of aspects of the virtual or corresponding real objects. In some embodiments, such models provide the entities of the persistent virtual world system 112 with self-computing capabilities and autonomous behavior. In some embodiments, suitable models comprise one or more of a 3D model, geometric model, dynamic model, and machine learning model.

The distributed 3D engine 212 of the current disclosure refers to a distributed version of a 3D engine being implemented in a distributed deployment (e.g., in a plurality of server or client computers). The distributed 3D engine 212 is configured to virtually pool, allocate, provide, and dynamically load balance and allocate resources (e.g., computing power, memory and network), through the resource manager 214. The connection and access of the distributed 3D engine 212 to the persistent virtual world system 112 enables the load balancing to be accurately performed by using spatial computing principles to assess demand in each of the cells representing at least one portion of a real or virtual world. As part of the resource provisioning, the distributed 3D engine 212 provides on demand, through a plurality of individual distributed software engines, a plurality of engine services (e.g., 3D rendering, graphics, physics, audio, artificial intelligence, positioning, and communications). The hardware operations performed to provide each of the mentioned engine services may be provided by a plurality of corresponding hardware engines. This pooling of resources is implemented through virtualization as described above. Thus, the concept of a distributed 3D engine 212 of the current disclosure should not be interpreted simply as a gathering of functionalities abstracted in libraries that can be reused between different applications (e.g., video games), but as a distributed hardware and software implementation encompassing engine operations that are pooled, allocated, provided and load balanced through the resource manager 214 using spatial computing principles employing the persistent virtual world system as a base for said operations.

In the current disclosure, the term "spatial computing" refers to the usage of physical space in order to send input and receive output from a computer. Thus, spatial computing uses the geometric properties of a virtual object and its position and orientation in order to perform the required computing and dynamic load balancing.

The virtual objects 110 may be fed with data obtained from simulations, input by users through user devices, or captured by sensor devices (e.g., for persistent virtual world systems based off a real world), such as by Internet of Things devices. The continuous flow of data can maintain the persistent virtual world system 112 periodically updated. Thus, the persistent virtual world system 112 from at least one portion of the real world is not just a visual 3D representation of the real world, as it is the case with many current virtual world systems, but it is a multi-dimensional representation of the real world, because the virtual objects 110 comprise models and data from other dimensions, or aspects, of the real world. For example, a plurality of virtual objects 110 may comprise data related to the temperature, fuel consumption, speed, power, pressure, mass, sound, etc., enabling as well connections and communications between each virtual object.

In some embodiments, virtualization of a virtual or real world comprises performing a plurality of simulations of the same world in a variety of levels of detail (LOD). LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models. This enables different simulations to be performed depending on the case and situation. LOD management allows also to provide an optimized user experience, depending on the specific requirements and context. Therefore, the same virtual or real world can be simulated at different LOD to facilitate the load balancing methods of the current disclosure while providing a suitable experience to users. For example, a real-world simulation in the persistent virtual world system 112 can comprise a high fidelity simulation of at least one portion of the real world for purposes of visualization of a human user, and a lower fidelity simulation to assess the demand of each cell and facilitate the load balancing of the high fidelity simulation. The low fidelity simulation may thus facilitate viewing which areas may be over-loaded and which areas not while utilizing less resources. In another example, virtualization of a manufacturing plant, because of the accurate spatial representations and relations between objects, apart from data and models related to the current energy consumption, production rates, efficiency, etc., of each machine of the manufacturing plant, can enable an accurate management of the manufacturing plant including demand assessment and corresponding resource allocation through the distributed 3D engine 212. The manufacturing plant may be simulated at a high fidelity for purposes of management of the manufacturing plant (e.g., controlling of the production process and all the elements in the plant), and additionally be simulated at a low fidelity for purposes of managing the load balancing of the manufacturing plant. The same LOD principle above may apply to a persistent virtual world system 112 based off a virtual world, wherein a low-fidelity version of the virtual world may be simulated within the persistent virtual world system 112 for purposes of low balancing of the virtual world, while a high-fidelity version of the virtual world may be simulated for providing a better user experience.

"Self-computing capabilities", also referred to as "self-managing capabilities" refers herein to the ability to apply artificial intelligence algorithms in order to autonomously manage computing resources. In an embodiment, virtual replicas with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual object, such as virtual replicas of real objects, may exhibit autonomous behavior, acting autonomously depending on the conditions in the real world reflected in the persistent virtual world system (e.g., by allocating required resources, autonomously sending and executing commands and/or generating events as required by each circumstance). Achieving this type of behavior may require training the virtual objects with artificial intelligence algorithms during the modeling of the virtual objects.

Virtual replicas may obtain data from one or more sources (e.g., from one or more real-world objects, environmental sensors, computing devices, etc.). As used herein, the term "multi-source data" refers to data that may be obtained from multiple sources. Virtual replicas may be updated based on multi-source data, such as by updating known parameters or features, by enriching the virtual replicas with additional parameters or features, or the like.

In the current disclosure, the term "enriching" is used to describe the act of providing further properties to a virtual replica based on multi-source data. For example, enriching the virtual replicas may refer to providing real-world data captured from sensor mechanisms on client devices, wherein the further real-world data comprises video data, temperature data, real-time energy consumption data, real-time water consumption data, speed or acceleration data, and the like.

In some embodiments, some of the virtual replicas 206 may be virtual avatars of real users accessing the persistent virtual world system 112 via client devices. In these embodiments, the resources are published on the corresponding cells where the virtual avatars of the users are active, e.g., corresponding to the position and orientation where the users may be viewing through their client devices, so that the resources are received by the user through the corresponding virtual avatar subscribing to the corresponding cells via the user client devices. Likewise, when applications 208 and/or pure virtual objects 210 are active in a cell, these virtual objects 110 subscribe to the cell, triggering the resource manager 214 to assess the demand and accordingly publish more or less resources that the virtual objects 110 can obtain by subscribing to the corresponding cell.

For example, a specific traffic light in a city is linked to a road or street and can be associated also to other objects, such as sensors or other traffic signals. These relationships can trigger events that may create new interactions in the persistent virtual world system 112, for example, an emergency car in a street can automatically trigger a priority event that will change the traffic lights pattern to avoid any stops in the intersections based on the simulation of the trajectory of the emergency car and the actual traffic conditions in the area. Management of resources during such an event, including the provisioning of devices (e.g., cars) involved in such an event, is performed by the resource manager 212. In some embodiments, such conditions, events and consequences might be programmed as smart contracts bound to traffic-specific distributed ledger, e.g. a traffic sidechain with many smart contracts defining a variety of codified traffic rules and expect behaviors, hence automatizing and recording the occurrences of such events.

In some embodiments, the pure virtual objects 210 refer to objects that exist only in the persistent virtual world system 112, and thus do not have a counterpart object in the real world.

In some embodiments, the applications 208 can be one or more traditional applications, distributed applications or decentralized applications. Traditional applications are typically based on a traditional client-server model and run on a dedicated server in a static infrastructure. Distributed applications are applications stored mostly on cloud computing platforms, such as cloud servers of the current disclosure, and may run on multiple systems and devices simultaneously on the same network, or may run on blockchain or distributed ledger-based distributed databases. Decentralized applications run mainly on decentralized infrastructures such as in blockchains or distributed ledger-based distributed databases.

In some embodiments, the persistent virtual world system 112 may comprise a virtual world layer that may be separated into an augmented reality (AR) layer and virtual reality (VR) layer. The separate layers may enable accessing the persistent virtual world system in any of augmented or virtual reality and combining elements stored in each layer, and may be activated through client devices connected the at least one server computer 102 through the network whenever accessing one or the other type of reality. Each of the layers may comprise augmentations of reality and virtual objects 110 that may be specific to each layer. For example, an AR layer may comprise only virtual replicas 206, applications 208, and pure virtual objects 210 that may only be visible when accessing the persistent virtual world system 112 in augmented reality. Likewise, a VR layer may comprise only virtual replicas 206, applications 208, and pure virtual objects 210 that may only be visible when accessing the persistent virtual world system 112 in virtual reality. However, a user may decide to activate both layers, or to adjust the level of each layer, so that at least some objects of one layer are visible at another layer. For example, when accessing a scene in virtual reality, it may be possible to activate the augmented reality layer enabling to view augmentations of real objects that are virtualized in the VR layer, such as seeing further descriptions of a building or touristic site.

In some embodiments, the distributed 3D engine 212 further comprises one or more individual distributed software engines 218. The distributed software engines 218 may be 3D engines decomposed into a plurality of dynamic and independent software modules, each software module programmed for performing specific engine tasks. The individual distributed software engines 218 may communicate with each other via, for example, the distributed message exchange platform 216. Each individual distributed 3D engine 218 may use the message exchange platform 216 to call service functions in other individual distributed software engines 218. Such calls may be performed indirectly (e.g., through a generic proxy function called by the distributed message exchange platform 216), or directly (e.g., by the distributed message exchange platform 216 holding direct communications with each individual distributed 3D engine 218).

In some embodiments, the one or more processors 202 may be one or more special purpose hardware engines 220. In other embodiments, the one or more processors 202 are general purpose processing units, or are special purpose processing units being supported by general purpose processing units. In some embodiments, the special purpose processing units are processing units tailored specifically for processing of one or more individual distributed software engines 218 for performing engine tasks. The special purpose hardware engines 220 may thus be designed and configured individually for the processing of operations related to one or more of 3D graphics, artificial intelligence operations, physics operations, 3D structures processing operations, simulation operations, tracking and positioning, or communications thereof. In some embodiments, each hardware engine 220 may be coupled on one or more electronic chips or systems on a chip comprising one or more specific hardware processing cores designated for processing each specific type of operation. The processing cores of the one or more electronic chips may be regarded as functional units or modules of the electronic circuits of the electronic chip designed for physically executing required algorithms of each individual distributed software engine 218. For example, at least one of the one or more processing cores may be realized as an FPGA or any other form of an integrating circuit implementing a dedicated functionality. Accordingly, the one or more electronic chips may include at least one integrated circuit realizing at least some of the one or more processing cores, wherein at least one of the processing cores implements the different special-purpose hardware engines 220. In some embodiments, the electronic chips may additionally comprise general-purpose processing cores, such as CPUs and/or GPUs, or may connect to external CPUs and/or GPUs for providing them with additional support for each engine task. Providing special-purpose hardware engines 220 enables each of the individual distributed software engines 218 to have a greater pull of resources for executing a greater number of tasks within the persistent virtual world system, as each individual distributed 3D engine 218 may obtain resources from one or more dedicated hardware cores from the one or more hardware engines 220.

The processor 202 may refer to a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), and FPGA, amongst others.

The memory 204 may be of any suitable type capable of storing information accessible by the processor 202, including a computer-readable medium, or other medium that stores data that may be read with the aid of an electronic device, such as a hard-drive, memory card, flash drive, ROM, RAM, DVD or other optical disks, as well as other write-capable and read-only memories. The memory may include temporary storage in addition to persistent storage.

Instructions may be executed directly (e.g., machine code), or indirectly (e.g., scripts) by the processor 202. The instructions may be stored in object code format for direct processing by the processor 202, or in any other computer language including scripts or collections of independent source code modules that may be interpreted on demand or compiled in advance. Data may be retrieved, stored, or modified by the processor 202 in accordance with the instructions. Data may, for example, be stored in computer registers, in a relational database as a table having a plurality of different fields and records, XML documents, or flat files, amongst others. The data may also be formatted in any computer-readable format.

In some embodiments, the interaction mechanics with and between virtual objects 110 are defined through the use of computer code included in computer scripts and computer programs, and may be enabled through applications, smart contracts, or combinations thereof provisioned in the persistent virtual world system 112 where the interactions and interaction applications take place. The applications, smart contracts or combinations thereof thus enable digitally codifying and representing the possible and desired interactions and interaction interfaces between all elements of the real world through the persistent virtual world system 112. Interactions may be experienced by users in the form of interactive game-like applications or through game-like interaction mechanics.

Figure 3:
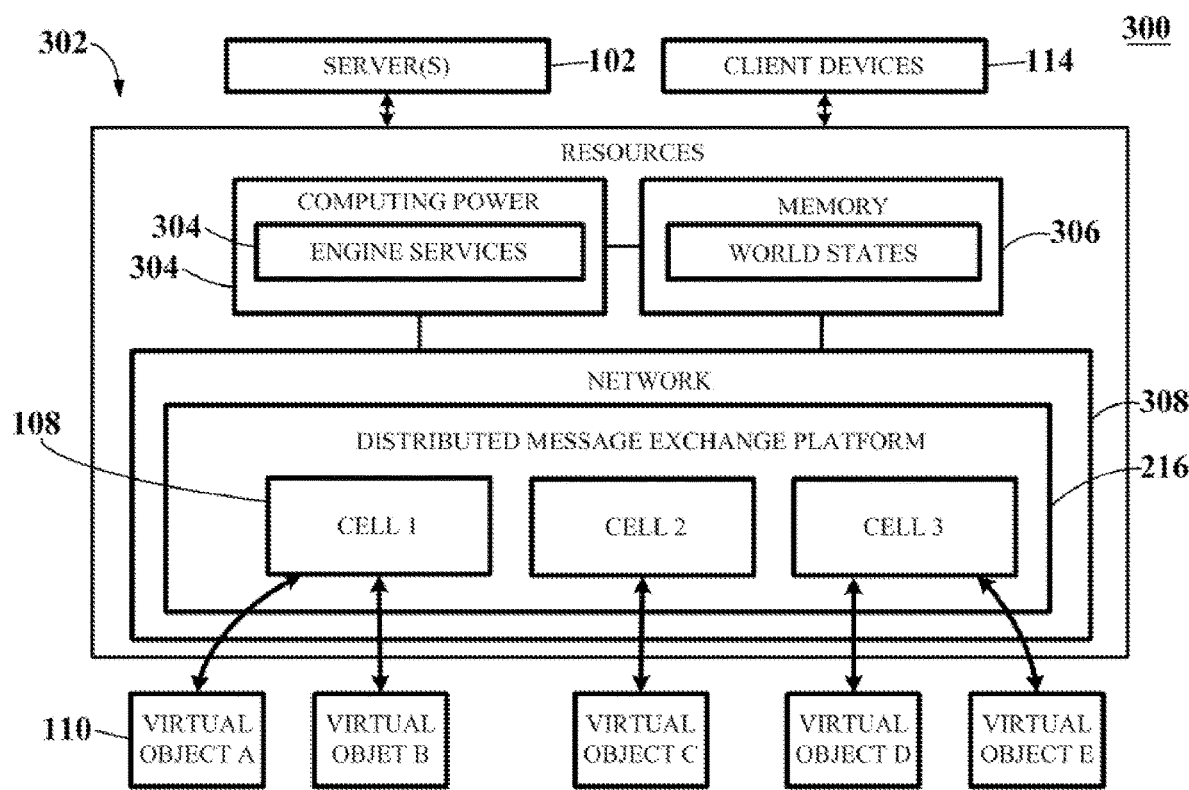
FIG. 3 depicts a schematic representation of a resource allocation through a distributed message exchange platform, according to an embodiment.

FIG. 3 depicts a schematic representation of resource allocation system 300 through a distributed message exchange platform 216 of a resource manager, according to an embodiment The resource allocation system 300 allocates resources 302 to the distributed message exchange platform 216, wherein the resources 302 comprise computing power 304, memory 306 and network 308, and wherein the resources 302 may be obtained from one or more server computer 102 and/or client devices 114. The distributed message exchange platform 216 receives requests from one or more virtual objects 110 present in a cell 108, and performs the corresponding allocations by publishing to the cells 108. In some embodiments, in order to perform these resource allocations, the distributed message exchange platform 216 utilizes a publish-subscribe model, whereby the one or more virtual objects 110 subscribe to one or more cells 108 where resources 302 have been published. For example, a virtual object representing a user, or user virtual avatar, may be active in a specific cell 108, triggering the resource manager to publish resources required by the user virtual avatar to the corresponding cell, wherein said publishing is performed through the distributed message exchange platform 216. Thus, the resources 302 are published once to the distributed message exchange platform 216 and are delivered to each virtual object 110 that subscribe 310 to them. This contrasts with typical 3D engine systems developed for provisioning virtual worlds, which output a complete data update packet for each client device within a map, tailoring each packet for the client device so that the client device receives only data that may be relevant to the client device and for objects within sight, leading the 3D engines to potentially send the same data multiple times once for each client device to which the object may be visible.

The publish-subscribe model is a model of communication based on the production and consumption of content, which differs from the commonly-used client/server-based communication model where communication usually takes place between two nodes: the client and the server. Such a communication through the publish-subscribe model may be enabled to be anonymous, meaning that server computers 102 and/or client devices 114 do not need to know who subscribed to which cell 108 to obtain the resources 302; likewise, virtual objects 110 obtaining the resources do not need to know where the resources 302 have come from. Typical publish-subscribe models enable information exchange to which everybody can publish and receive information, enabling greater degrees of flexibility than typical client-server models. However, usage of publish-service models can also bring about inefficiency concerns, since typically every single publication is transported to every single participant, which have to analyze the information in order to determine its relevance. On the other hand, the publish-subscribe model of the current disclosure enables dynamically concentrating a greater amount of resources to cells 108 that require them the most, e.g., to higher-resource demanding cells 108 where virtual objects 110 can subscribe to. Also, as the amount of resources published take into account the amount of virtual objects 110, level of interactions within the portion of the persistent virtual world system visible to a user, and other parameters, each virtual object 110 obtains from each subscribed cell only the resources required during the respective simulation.

In some embodiments, the computing power 304 of the resources 302 comprises engine services 314 obtained from one or more individual distributed 3D engines (e.g., individual distributed software engines 218 of FIG. 2). In further embodiments, the memory 306 of the resources 302 stores world states, which are also published to the corresponding cells 108 to provide client devices that subscribe to the cells 108 with an updated version of the real world through the virtual world. In a further embodiment, the distributed message exchange platform 308 is comprised as part of the network resources that are accordingly shared. In some embodiments, a plurality of distributed software engines 218 can be used in parallel or sequentially within the network 308 to create synergies with each other.

The term "engine services" as used herein refers to operations performed and provided by one or more 3D engines in order to achieve one or more tasks, such as game or other application-related tasks. 3D engines usually comprise software components such as libraries, software development kits (SDKs), objects, and the like required to perform such tasks. Engine services comprise, for example, services related to 3D rendering, graphics, physics, audio, artificial intelligence, positioning, and communications. Each of the engine services may be performed by individual distributed software engines being provisioned by hardware engines, which can be special purpose hardware engines, general purpose hardware engines, or combinations thereof, each hardware engine comprising circuitry dedicated to executing instructions from functions called by the individual distributed 3D engines.

The term "world state", as used herein, refers to the state of each of the virtual objects in the persistent virtual world system, which may be updated in time through a plurality of connected devices including sensors providing sensor data to the persistent virtual world system. The connected devices may be, for example, Internet of Things (IoT) devices that may communicate to each other and to the servers through a network, and may continuously capture multi-source data from the real world in order to update the virtual replicas of the persistent virtual world system. Thus, the state-updates may result from the sensor data. However, updates of the world state may also result from user input, or from computations (e.g., artificial intelligence inferences) from the one or more 3D engines.

In some embodiments, the allocation to virtual objects 110 by publishing to cells 108 may be based on a current load and a corresponding computed and ranked demand. With reference to FIG. 2, such a computation and ranking of demand may be performed by, for example, the resource manager 214 of the distributed 3D engine 212. The ranking may assist in the determination of the amount of resources 302 to publish to each cell 108, such that lower-demand ranked cells may obtain fewer resources 302 than higher-demand ranked cells. In some embodiments, the demand takes into account the amount of virtual objects 110 within the portion of the persistent virtual world system visible to a user through a corresponding client device within a cell. The portion of the persistent virtual world system visible to a user avatar may be defined by a field of view or field of the avatar within a cell. For example, when a user views a portion of the world in augmented or virtual reality, a corresponding avatar may be available in the persistent virtual world system, and thus the viewing frustum of the user avatar may define such a field of view. In other embodiments, when the user is using an avatar through a "flat" user interface, such as through a computer or mobile phone screen, an actual user avatar may be visible in the computer screen, wherein the user avatar views and interacts within a portion of the persistent virtual world system. In such an example, the user avatar may view the persistent virtual world system in a first-person view, and the viewing frustum of the avatar in first person may define the field of view. In an embodiment where the user avatar is seen from a top-view, the field of view may be defined by a radius around the user avatar. In all cases, the field of view may comprise a plurality of virtual objects 110 that users may have the possibility to interact with through the user avatar. Therefore, the more virtual objects within the field of view of the user avatar, the higher the resource demand for that specific cell, and thus the higher the ranked-demand score. In other embodiments, the demand further takes into account the level of interactions within the portion of the persistent virtual world system visible to a user. For example, there may be two user avatars in two different areas of the persistent virtual world system and within two different cells, both having 5 virtual objects 110 available for interaction. If the first user were to decide to interact simultaneously with all the virtual objects 110 (e.g., by engaging in a group activity, conversation, battle, etc.), then such a cell may have a higher ranked demand and thus more resources allocated than the second user avatar, if the second user avatar were not to interact with any of the virtual objects 110, or were to have lower levels of interaction with such virtual objects 110. In this example, the ranked demand is higher for the virtual cell where the first user avatar is located than that where the second user avatar is located.

In other embodiments, the demand further factors in other parameters such as the distance between client devices and network equipment (e.g. servers and/or antennas), the type of application being used by users, or the type of entitlements that a user may have depending on his individual user profile or contract details. As an example of the distance between client devices and network equipment, the farther away a user may be from network equipment within a specific cell of the persistent virtual world system, because each cell may have specific network equipment allocated, there could be more network equipment that could be activated simultaneously to compensate for a potential lower Quality of Service (QoS), resulting in a higher ranked demand for that cell. As an example of an application being used by users, if an application consumes more resources such as bandwidth or computing power because of requiring higher real-time rendering rates or better Level of Detail and definition, then that would represent an increase in the resources required for that cell and therefore a corresponding increase in the ranked demand. As an example of the type of entitlements, a user may be registered as a premium account user to obtain higher quality of service (QOS) and higher data transfer speed than other users, resulting in a higher allocation of resources than for other users. Furthermore, all of the factors above may be computed in combinations with each other to determine the ranked demand for each cell.

Figure 4A:
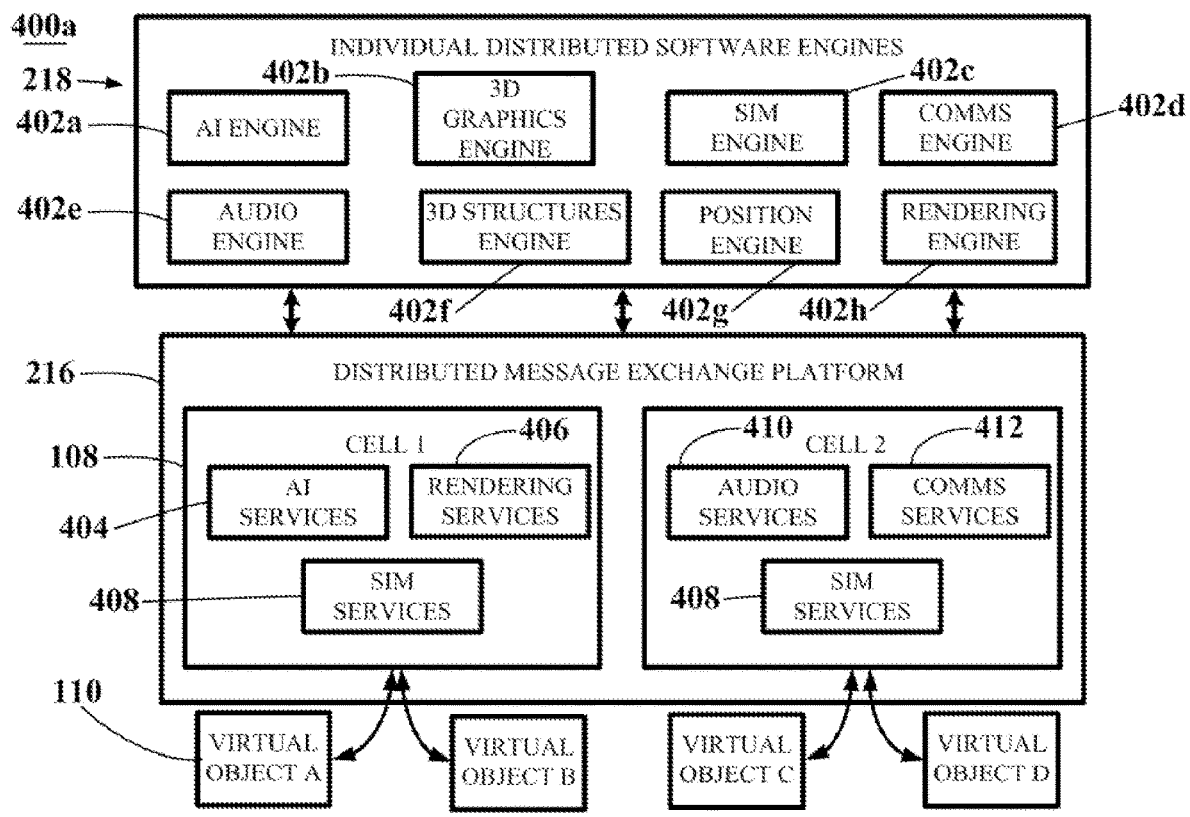
FIGS. 4A-4B depict schematic representations of engine service allocation through the distributed message exchange platform, according to an embodiment.
Figure 4B:
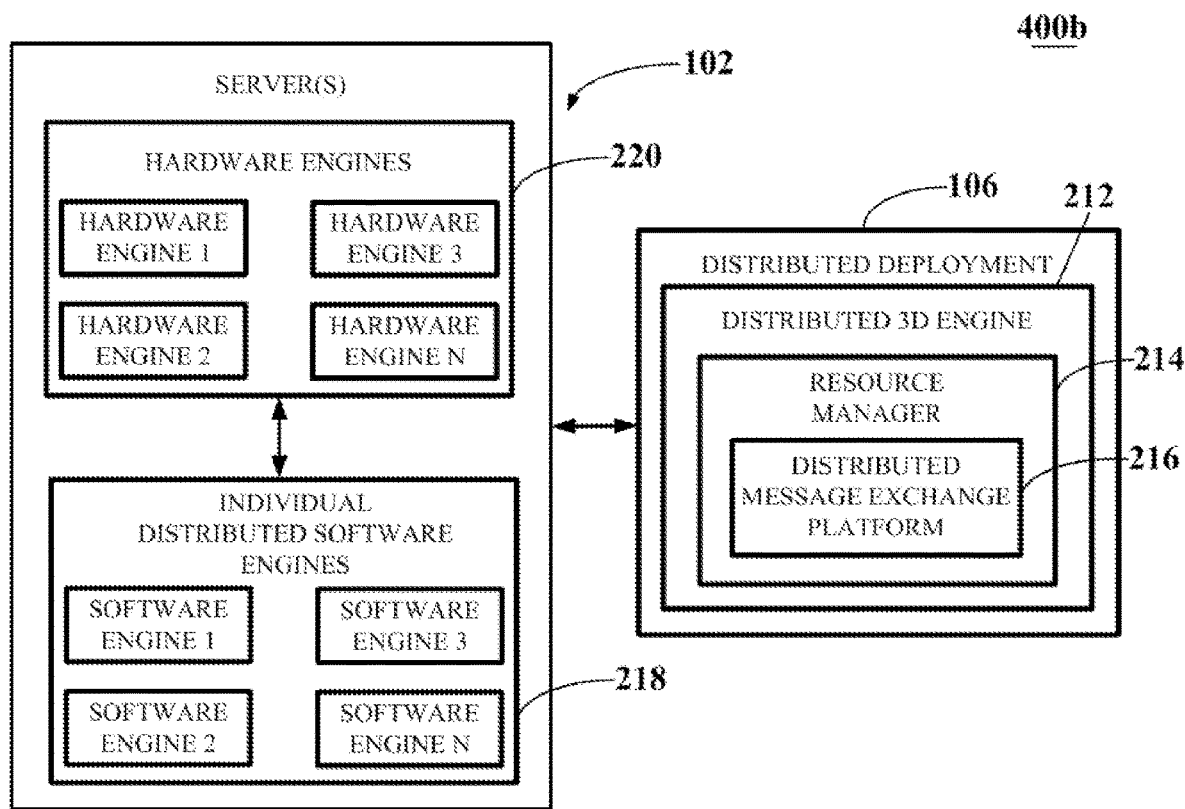

FIGS. 4A-4B depict schematic representations 400a-b of engine services allocation through the distributed message exchange platform 216, according to an embodiment.

The schematic representation 400a of FIG. 4A comprises a plurality of individual distributed software engines 218 hosted on a one or more servers, such as server computers 102 of FIG. 1. Each individual distributed software engine 218 provides specific engine services which can be published to a cell 108 via the distributed message exchange platform 216. Then, virtual objects 110, such as virtual objects A-D, may obtain those engine services by subscribing to the cell 108 where they are located, such as cells 1-2.

As viewed in FIG. 4A, the individual distributed software engines 218 may be a plurality of dynamic and independent software modules designed for one or more specific types of tasks. The individual distributed software engines 218 are independent entities providing functionalities for which the individual distributed software engines 218 have been programmed. Thus, the individual distributed software engines 218 may be, for example, an artificial intelligence engine 402a, 3D graphics engine 402b, simulation engine 402c, communications engine 402d, audio engine 402e, 3D structures engine 402f, position engine 402g, and rendering engine 402h, amongst others. Communication between the individual distributed software engines 218 is implemented through function calls managed by the distributed message exchange platform 216.

In some embodiments, a plurality of distributed software engines 218 can be used in parallel or sequentially within the network to create synergies with each other. For example, a plurality of 3D graphics engines 402b hosted at the same or different server computers may allocate engine services sequentially or in parallel, through the distributed message exchange platform 216, in order to complement the engine services of each other for the realization of one or more specific tasks. In one example, different 3D graphics engines 402b compute the 3D models of different locations, wherein the locations can be in the same or in a different cell 108. In another example, different 3D graphics engines 402b can compute different applications located in the same area, where at least some of the applications are configured in an AR layer, and where at least some of the applications are configured in a VR layer. By way of example, the same location within a same cell is computed by Unity® in the VR layer, while any augmentations such as pure virtual objects and applications configured in the AR layer are computed partially by CryEngine® and by UnrealEngine®. Further in this example, a contiguous location within the same or different cell 108 can be computed in the VR layer by CryEngine®, whereas augmentations in the AR layer are computed partially by UnrealEngine® and Unity®.

Further in FIG. 4A, virtual objects A-B are currently located in cell 1 of the persistent virtual world system, and are receiving a plurality of engine services, such as AI services 404 provisioned by the AI engine 402a, rendering services 406 provisioned by the rendering engine 402h, and simulation services 408 provisioned by the simulation engine 402c, which may be required for the current application and processing of virtual objects and interactions in the current cell 1. On the other hand, virtual objects C-D are currently located in cell 2 of the persistent virtual world system, and are receiving a plurality of engine services, such as audio services 410 provisioned by the audio engine 402e, communication services 412 provisioned by the communications engine 402d, and simulation services 408 provisioned by the simulation engine 402c, which may be required for the current application and processing of virtual objects and interactions in the current cell 2. These engine services may be provisioned by the same server computer hosting the individual distributed software engines 218, by a plurality of server computers hosting the individual distributed software engines 218, or by combinations thereof.

FIG. 4B illustrates a schematic representation 400b depicting the relationship between individual distributed software engines 218, hardware engines 220, and the distributed 3D engine 212 of the one or more servers 102. Upon receiving requests from one or more virtual objects located in a cell 108, the resource manager 214 hosted on the one or more server computers 102 receives the requests, assesses the demand, and requests, through the distributed message exchange platform 216, the engine services to the one or more server computers 102 hosting the software and hardware engines 218-220, respectively. Each of the engine services may be provided by individual distributed software engines 218, such as 3D engines 1-N being provisioned by respective hardware engines 220, such as hardware engines 1-N, which can be special purpose hardware engines, general purpose hardware engines, or combinations thereof. The distributed message exchange platform 216 then receives the respective engine services and publishes them to the one or more cells 108 requiring the engine services. Virtual objects requesting the services then subscribe to the respective cell to receive the necessary engine services through the distributed message exchange platform 216.

Figure 5A:
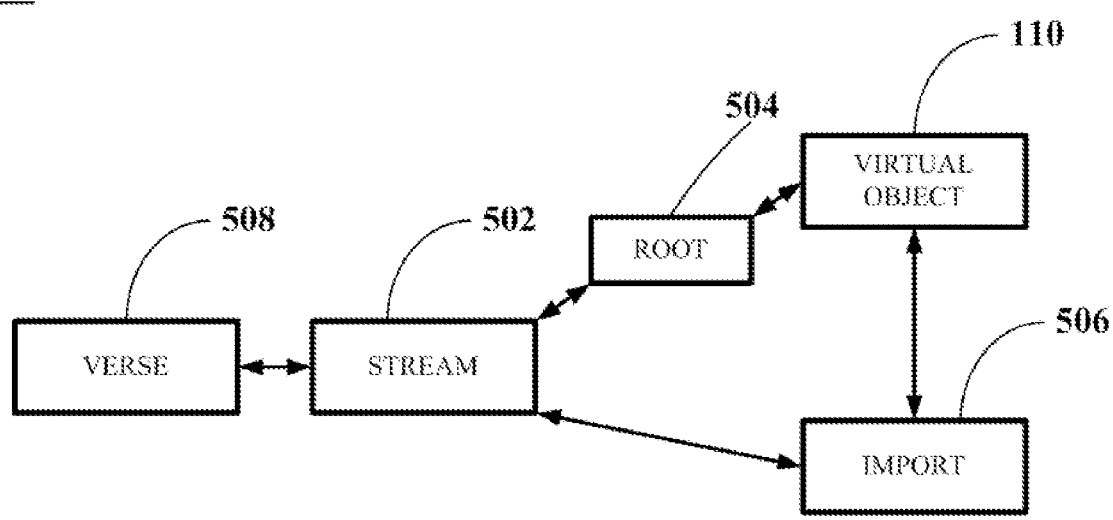
FIGS. 5A-5C schematic representations of the relationship between elements of a persistent virtual world system, according to an embodiment.
Figure 5B:
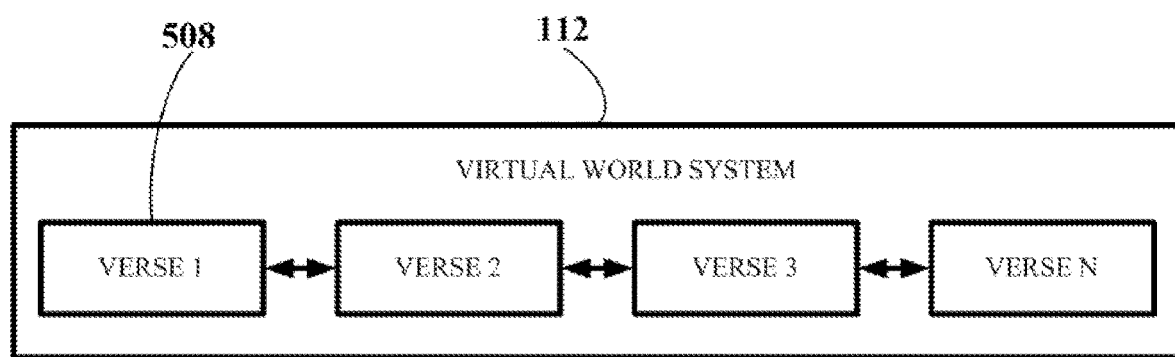
Figure 5C:
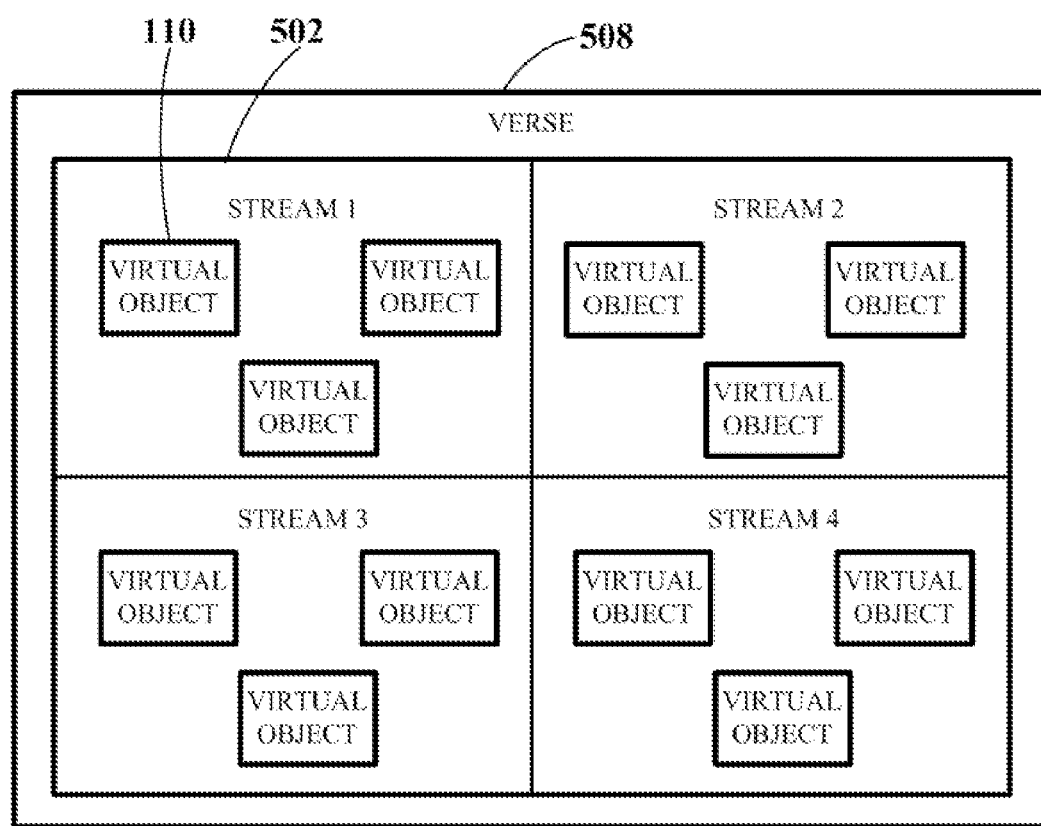

FIG. 5A-5C depicts schematic representations 500a-c of the relationships between a sub-universe (also referred to herein in shortened form as a "verse"), a stream and other elements of a persistent virtual world system, according to an embodiment.

Making reference to the schematic representation 500a of FIG. 5A, a plurality of connected virtual objects 110 that may be used for goal-specific simulations may constitute a stream 502, wherein each stream 502 is configured to obtain data from the corresponding virtual objects 110 and to perform goal-specific simulations. Each stream 502 may connect to a root node 504 or root simulation object that spawns a plurality of stream-related virtual objects 110. The stream 502 may additionally connect to an import function 506 that defines the virtual objects 110 that the stream 502 needs in order to perform the required simulations. For example, there may be a traffic stream 502 comprising a plurality of virtual replicas of vehicles, people, traffic lights, and even weather conditions. In other words, the stream 502 includes any number of virtual objects 110, such as virtual replicas, that may be related to the specific function of the stream 502. In this example, the import function 506 may define which virtual objects 110 to consider for the traffic simulation. The stream 502 may then read the behavior of each of the corresponding virtual objects 110 by using a combination of virtual and/or real sensors and performing goal-specific simulations of traffic scenarios. For example, a goal may be for the traffic stream to be optimized, to run at a pre-determined average speed, or to reduce the chances of traffic jams. Such simulations may be used, for example, to drive autonomous cars or drones. Another example of a stream 502 may be energy consumption, which may include virtual replicas of buildings including electricity consumption data, and specific energy-consuming virtual replicas such as machines, computers, appliances, etc.

Continuing the description with reference to FIG. 5A, a plurality of streams 502 comprising all or most virtual objects 110 in a pre-determined environment forms a sub-universe, herein referred to as a verse 508. For example, a city-verse 508 may represent all or most of the buildings, trees, people, streets, traffic lights, vehicles, etc., of a city. In some embodiments, there may also be a verse 508 within a verse 508, such as a house-verse within a city-verse, which may include the 3D design of the exterior and interior of the house, and all or most of the appliances, people, walls, energy consumption data, etc., of a house.

Making reference to the schematic representation 500b of FIG. 5B, a network of verses 508, such as verses 1-N, may form a persistent virtual world system 112. For example, a city-verse may connect to other city-verses to form a country-verse. If the country-verse does not connect to any other verses 508, then the country-verse may represent the universe of the persistent virtual world system 112.

Making reference to the schematic representation 500c of FIG. 5C shows a spatial diagram of a verse 508 comprising a plurality of streams 502, such as streams 1-4, each of which comprises a plurality of stream-related virtual objects 110.

Figure 6A:
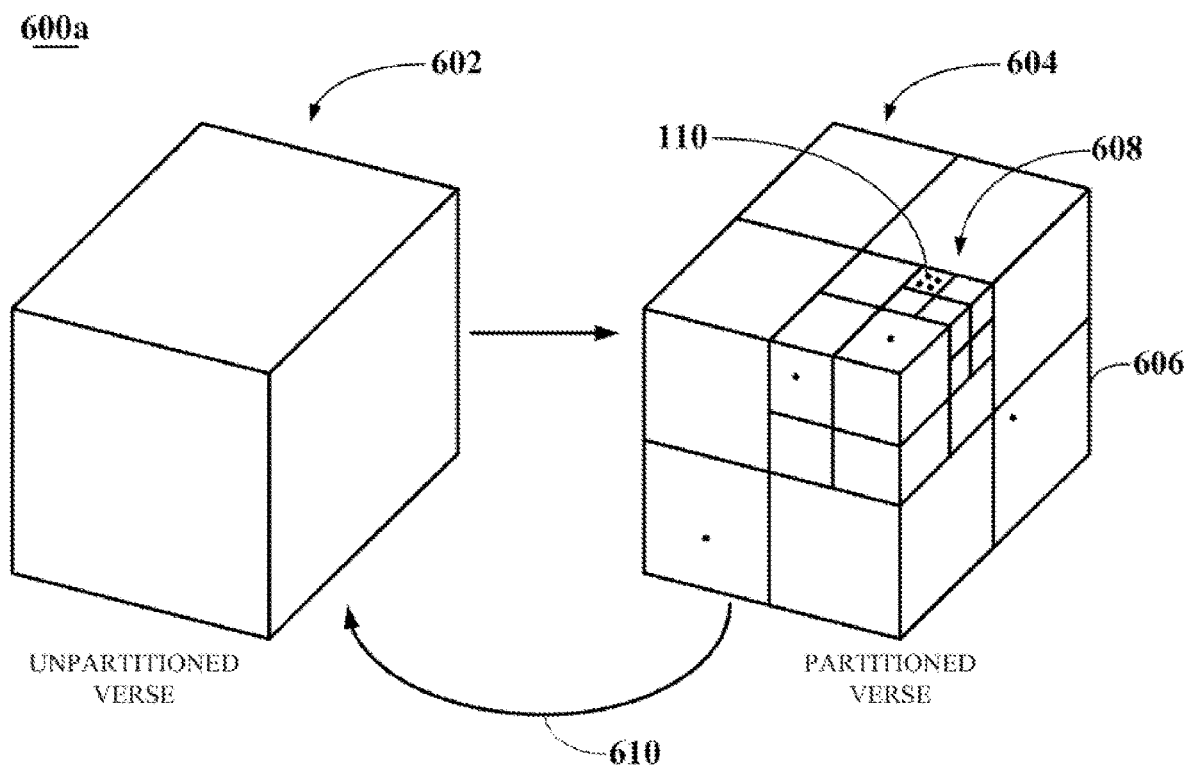
FIGS. 6A-6B depict schematic representations of a partitioning into a plurality of cells, according to an embodiment.
Figure 6B:
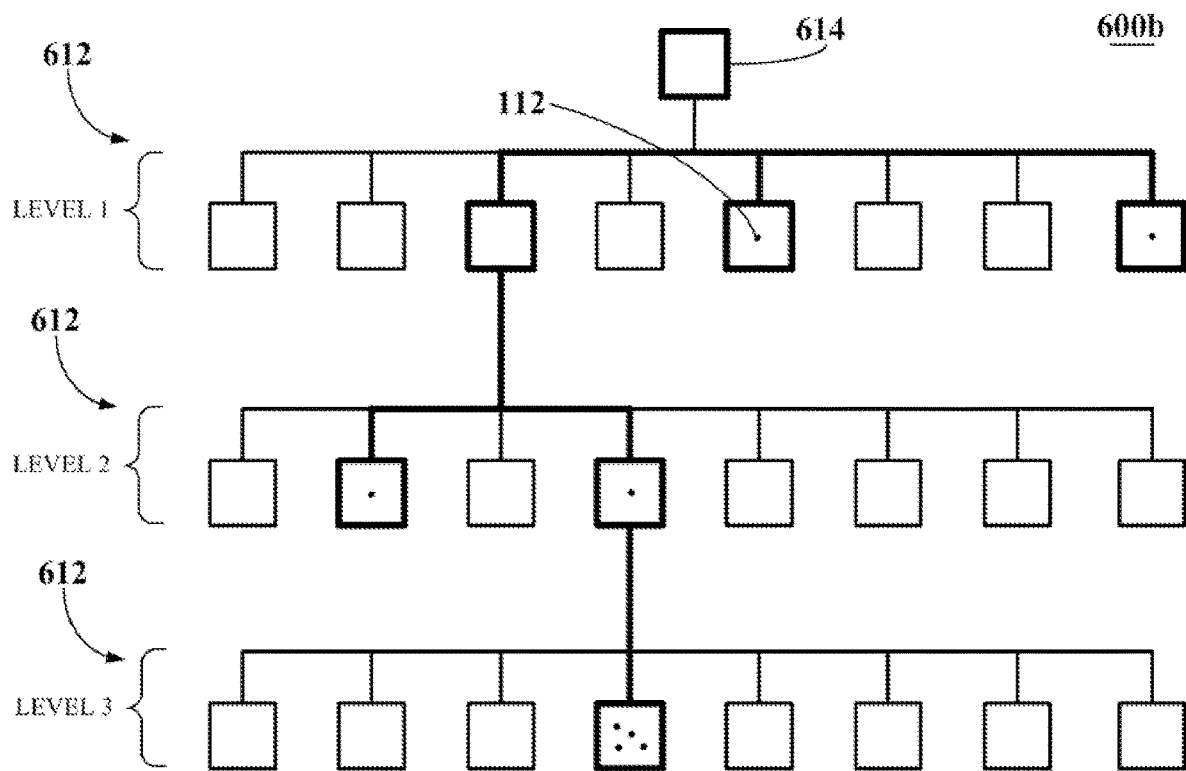

FIGS. 6A-6B depict schematic representations 600a-b of a partitioning of a verse 508 into a plurality of cells 108, according to an embodiment.

As viewed in FIG. 6A, an unpartitioned verse 602 representing an area of the world may, upon the resource manager requesting resources based on requests from virtual objects 110, be partitioned into a partitioned verse 604 comprising a plurality of cells 606. Higher resource-intensive cells 608, such as cells comprising a higher number of virtual objects 110, may be further partitioned into a greater number of cells 606. Likewise, cells 606 with a fewer number of virtual objects 110 may be partitioned into a fewer number of cells 606. Accordingly, each cell 606 is assigned with resources, wherein higher resource-intensive cells 608 receive more resources than lower resource-intensive cells 606. For example, some cells 606 within the higher resource-intensive cells 608 comprise more virtual objects 110 than the rest of the cells 606. However, it may be understood that the amount of resources allocated to each cell 606 are not just associated to the number of virtual objects 110 in the specific cells 606, but also to the level of interactions within the portion of the persistent virtual world system visible to a user; the distance between users and network equipment such as servers and/or antennas; the type of application being used by users; the type of entitlements that a user may have depending on his individual user profile or contract details; or combinations thereof. However, as a simplification and for illustrative purposes, FIGS. 6A-6B utilize only virtual objects 110 as a parameter for assessing the demand and managing allocation to the one or more cells.

In some embodiments, the data structure representing the real world into cells is an octree data structure, wherein each cell is represented as a voxel within the octree data structure. In some embodiments, the voxels utilized in the octree data structure are sparse voxels for use in the arrangement of larger portions of the real world. In other embodiments, the voxels utilized in the octree data structure are dense voxels for use in the arrangement of smaller portions of the real world. Octrees and the selected sparse or dense voxels are suitable data structures for representing three-dimensional space in virtual worlds, such as in the persistent virtual world system representing the real world. Octrees enable a fast and easy combination of a plurality of objects, implement relatively simple rendering algorithms, enable performing quick spatial searches, and enable a model generation through virtualization of real objects (e.g., through LIDAR or other image scanning methods). For a virtual world comprising a 3D virtual world representing at least one portion of the real world, such a 3D partition of the world enables a three-dimensionally-based engine service and cloud resource allocation on the areas where a user may be looking and/or interacting. However, quadtrees may also be utilized when dealing with cases of a 2D world. In other embodiments, other suitable data structures may be utilized, such as BSP trees, sparse voxel octrees, 3D arrays, kD trees, point clouds, wire-frames, boundary representations (B-Rep), constructive solid geometry trees (CSG Trees), bintrees, and hexagonal structures, amongst others.

In some embodiments, a data structure includes a collection of data values, relationships and functions or operations that can be applied to data, wherein the data defines at least the geometries and coordinates of virtual objects in the persistent virtual world system. For example, a correct data structure selection depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

Further in FIG. 6A, after ending an event associated to the one or more requests, the resources are restored to the original one or more sources. Subsequently, the partitioned verse 604 is consolidated back into the original number of cells 606, as represented by the curved arrow 610 pointing from the partitioned verse 604 back to the unpartitioned verse 602. This way, the system achieves an efficient and dynamic allocation of resources by selecting the areas of interest with higher demand and returning the resources to their sources when they are not needed anymore.

FIG. 6B depicts an illustration of an octree data structure 600b. The octree data structure 600b represents a volume directly in the data structure, such as a volume representing at least a portion of the real world. The main advantages of octree data structures 600b are fast and easy combination of several objects; implementing a simple rendering; enabling performing quick spatial searches; and enabling a model generation through digitalization of real objects (e.g., LIDAR or other image scanning).

Octree data structures 600b are a tree data structure in which each internal node has eight children nodes, or octants. The further a verse is partitioned, the further levels of children nodes are generated and the more resources are allocated to the further partitioned cells that need the resources. Thus, in the example of FIG. 6B, the octree data structure 600b has generated three levels 612 of children nodes, levels 1-3, plus a root node 614 representing the whole verse. Areas of the octree data structure 600b that have been bolded represent the areas with virtual objects 110. The upper levels of the octree data structure 600b of the verse represent areas that require less partitioning, and thus less resources, as, for example, there are fewer virtual objects 110 located in them. In contrast, lower levels comprising a greater number of virtual objects 110 require more partitioning, and thus more resources.

Figure 7:
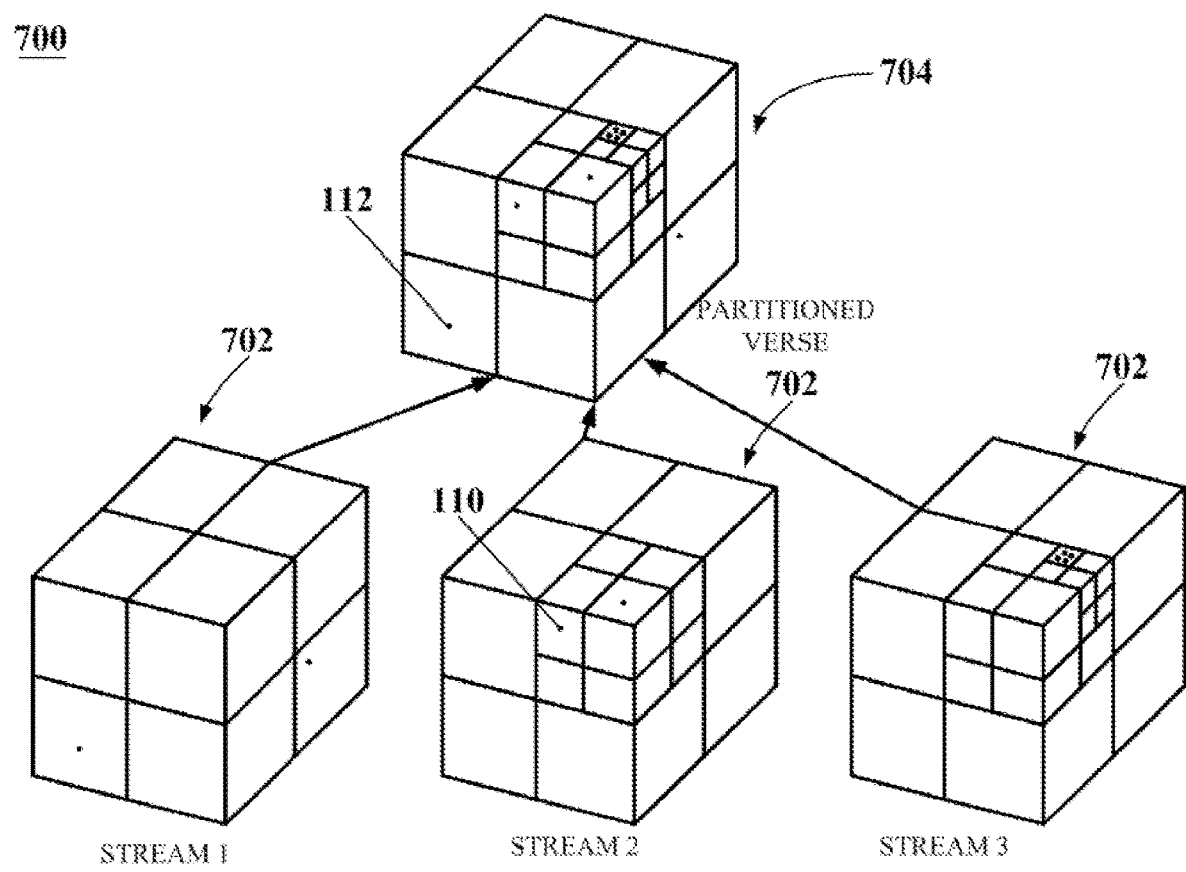
FIG. 7 depicts a schematic representation of a further embodiment of a partitioning into a plurality of cells, according to an embodiment.

FIG. 7 depicts a schematic representation 700 of a further embodiment of partitioning of a verse into a plurality of cells, according to an embodiment.

The schematic representation 700 shows a partitioned verse 604 comprised of three streams 702, streams 1-3, wherein each stream 702 comprises one or more stream-specific virtual objects 110, and wherein each stream 702 is programmed to be enabled or disabled for viewing and interacting with on the client devices. In yet further embodiments, each stream 702 is associated to one or more user applications. Each stream 702 may be configured to obtain data from the corresponding virtual objects 110 and to perform theme and/or goal-specific simulations. Each stream 702 may connect to a root node or root simulation object that spawns a plurality of stream-related virtual objects 110. The streams 702 may additionally connect to an import function that defines the virtual objects 110 that the stream needs to perform the simulations.

For example, if a viewer is utilizing a restaurant application, the user may have the option to enable the restaurant stream (e.g., stream 1) of the partitioned verse 704, whereby only restaurants will be shown or highlighted to the user. Likewise, a traffic-related application may be configured to enable a traffic stream (e.g., stream 2) showing or highlighting the traffic to the user. In another example, a game-related application comprising a plurality of pure virtual objects can activate a game stream (e.g., stream 3), showing or highlighting the pure virtual objects associated to the gaming application. In the current example, stream 3 may require a greater amount of resources than the other streams 1-2 because of having more virtual objects 110. The sum of all the streams 1-3 would thus result in the partitioned verse 704. In some embodiments, depending on which streams 702 are activated, the activated streams 702 are viewed by users as rendered or un-rendered media streams output on client devices, wherein the streams 702 comprise 3D image data, 3D geometries, 3D entities, 3D sensory data, 3D dynamic objects, video data, audio data, textual data, time data, positional data, orientational data, haptic data, and lighting data, amongst others, or combinations of such media content. Each stream 702 can thus be computed and, optionally, rendered, by one or more of the individual distributed software engines being provisioned by one or more hardware engines. In some embodiments, one or more of the individual distributed software engines comprise instructions that, once executed by one or more hardware engines, trigger an end-to-end encryption (E2EE) of the streams 702 so that only users concerned with the specific streams 702 may receive and decrypt the media content of the streams 702. Such an embodiment may be used, for example, during video-calls utilizing end-to-end streaming services.

Figure 8:
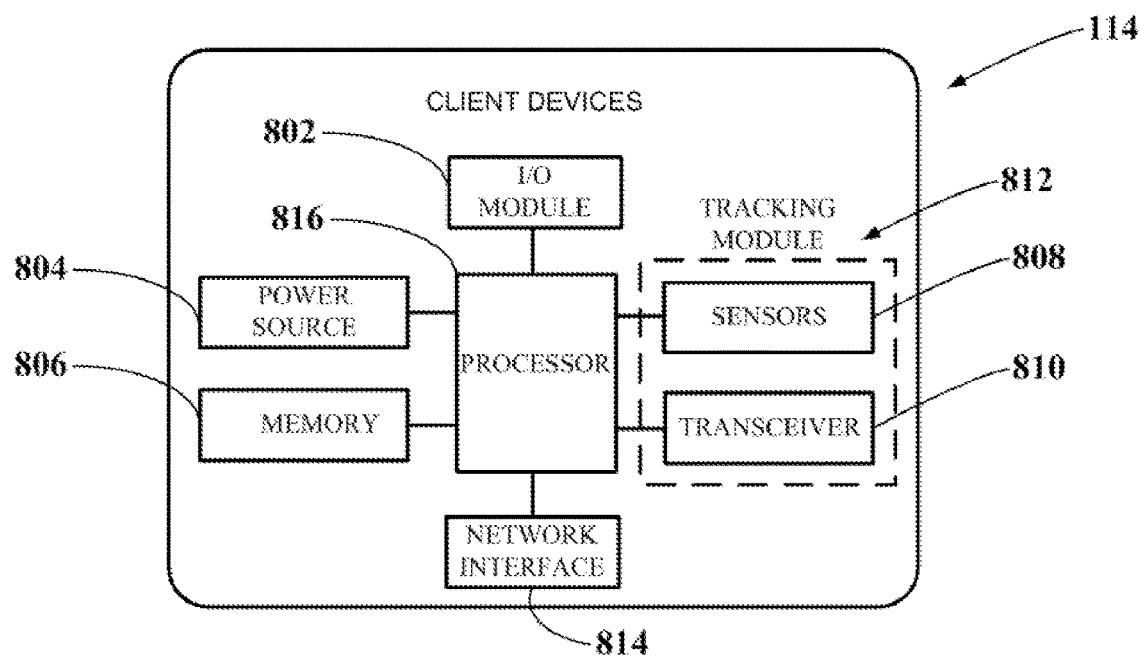
FIG. 8 depicts a schematic representation of a client device, according to an embodiment.

FIG. 8 depicts a schematic representation of a client device 114, according to an embodiment. Some elements of FIG. 9 may be similar to elements of FIG. 1-8, and thus similar or identical reference numerals may be used to depict those elements.

A client device 114 of the current disclosure may include operational components such as an input/output (I/O) module 802; a power source 804; a memory 806; sensing mechanisms 808 and transceivers 810 forming a tracking module 812; and a network interface 814, all operatively connected to a processor 816.

The I/O module 802 is implemented as computing hardware and software configured to interact with users and provide user input data to one or more other system components. For example, I/O module 802 may be configured to interact with users, generate user input data based on the interaction, and provide the user input data to the processor 816 before being transferred to other processing systems via a network, such as to a server. In another example, I/O modules 802 is implemented as an external computing pointing device (e.g., a touch screen, mouse, 3D control, joystick, gamepad, and the like) and/or text entry device (e.g., a keyboard, dictation tool, and the like) configured to interact with client device 114. In yet other embodiments, I/O module 802 may provide additional, fewer, or different functionality to that described above.

The power source 804 is implemented as computing hardware and software configured to provide power to the client device 114. In one embodiment, the power source 804 may be a battery. The power source 804 may be built into the client device 114 or removable from the client device 114, and may be rechargeable or non-rechargeable. In one embodiment, the client device 114 may be repowered by replacing one power source 804 with another power source 804. In another embodiment, the power source 804 may be recharged by a cable attached to a charging source, such as a universal serial bus ("USB") FireWire, Ethernet, Thunderbolt, or headphone cable, attached to a personal computer. In yet another embodiment, the power source 804 may be recharged by inductive charging, wherein an electromagnetic field is used to transfer energy from an inductive charger to the power source 804 when the two are brought in close proximity, but need not be plugged into one another via a cable. In another embodiment, a docking station may be used to facilitate charging.

The memory 806 may be implemented as computing hardware and software adapted to store application program instructions and to store sensor data captured by the plurality of sensing mechanisms 808. The memory 806 may be of any suitable type capable of storing information accessible by the processor 816, including a computer-readable medium, or other medium that stores data that may be read with the aid of an electronic device, such as a hard-drive, memory card, flash drive, ROM, RAM, DVD or other optical disks, as well as other write-capable and read-only memories. The memory 806 may include temporary storage in addition to persistent storage.

The sensing mechanisms 808 may be implemented as computing hardware and software adapted to obtain various sensor data from the real world and determine/track the position and orientation of the client device 114. The sensing mechanisms 808 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 808 include one or more Inertia Measuring Units (IMUs), accelerometers, and gyroscopes. The IMU is configured to measure and report the velocity, acceleration, angular momentum, speed of translation, speed of rotation, and other telemetry metadata of client device 114 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 810 may be implemented as computing hardware and software configured to enable client device 114 to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 810 may be a two-way communication transceiver 810.

In an embodiment, the tracking module 812 may be implemented by combining the capabilities of the IMU, accelerometers, and gyroscopes with the positional tracking provided by the transceivers 810 and the accurate tracking, low-latency and high QOS functionalities provided by mmW-based antennas may enable sub-centimeter or sub-millimeter positional and orientational tracking, which may increase accuracy when tracking the real-time position and orientation of client device 114. In alternative embodiments, the sensing mechanisms 808 and transceivers 810 may be coupled together in a single tracking module device.

The network interface 814 may be implemented as computing software and hardware to communicatively connect to a network, receive computer readable program instructions from the network sent by the server or by client device 114, and forward the computer readable program instructions for storage in the memory 806 for execution by the processor 816.

The processor 816 may be implemented as computing hardware and software configured to receive and process sensor data. For example, the processor 816 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 816 may receive user input data from I/O module 802 and may respectively implement application programs stored in the memory 806. In other examples, the processor 816 may receive sensor data from sensing mechanisms 808 captured from the real world, or may receive an accurate position and orientation of client device 114 through the tracking module 812, and may prepare some of the data before sending the data to a server for further processing. As way of example, the processor 816 may realize some of the steps required during data preparation including analog or digital signal processing algorithms such as raw data reduction or filtering of sensor data before sending the data to a server.

Figure 9:
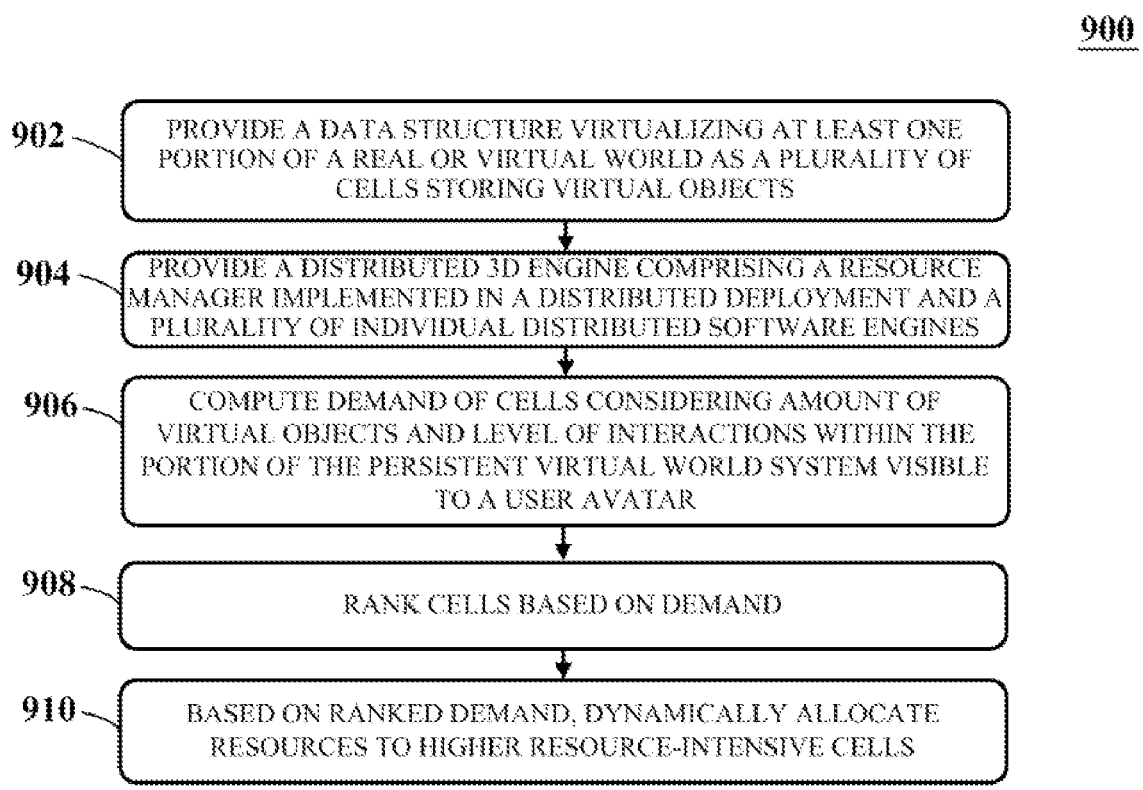
FIG. 9 depicts a block diagram of a computer-implemented method enabling a multi-dimensional 3D engine computing and virtualization-based dynamic load balancing of virtual or real worlds, according to an embodiment.

FIG. 9 depicts a block diagram of a computer-implemented method 900 enabling dynamic load balancing through a distributed 3D engine, according to an embodiment.

The method 900 enabling a multi-dimensional 3D engine computing and virtualization-based dynamic load balancing of virtual or real worlds begins in step 902 by providing, in memory of a server computer, a data structure representing at least one portion of the real world into a plurality of cells storing virtual objects forming a persistent virtual world system, wherein at least some of the virtual objects are virtual replicas of corresponding real world elements. The method continues in step 904 in the memory of the at least one server computer, a distributed 3D engine comprising a resource manager implemented in a distributed deployment and a plurality of individual distributed software engines.

Then, in step 906, the method proceeds computing, by the resource manager based on a current load, the demand of each individual cell, wherein said demand further considers one or more of an amount of virtual objects and level of interactions within the portion of the persistent virtual world system visible to a user avatar. In other embodiments, the demand takes into account other parameters such as the distance between users and network equipment such as servers and/or antennas, the type of application being used by users, or the type of entitlements that a user may have depending on his individual user profile or contract details. Based on the demand, the method continues in step 908 by ranking the cells by demand Subsequently, based on the ranked demand, the method continues in step 910 by dynamically allocating resources to the one or more higher resource-intensive cells.

Figure 10:
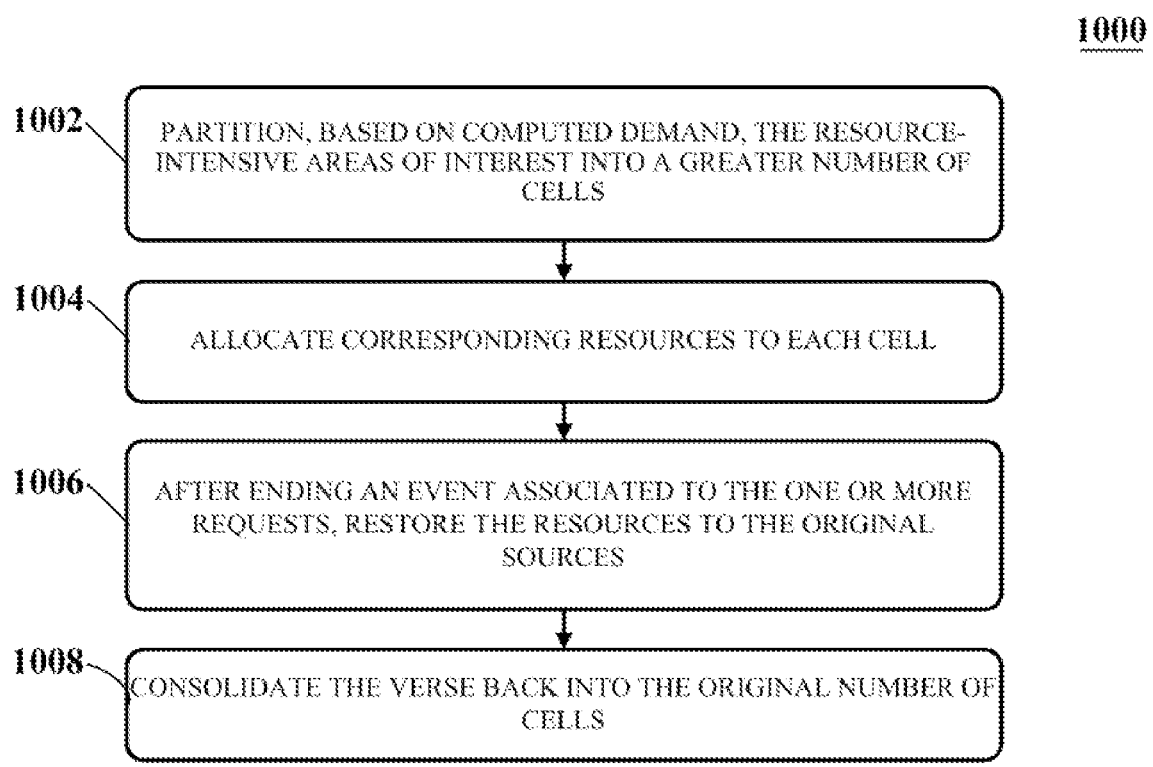
FIG. 10 depicts a block diagram comprising further steps of the computer-implemented method enabling a multi-dimensional 3D engine computing and virtualization-based dynamic load balancing of virtual or real worlds, according to an embodiment.

FIG. 10 depicts a block diagram of a computer-implemented method 1000 comprising further steps of method 900 enabling dynamic load balancing through a distributed 3D engine, according to an embodiment.

According to an embodiment, the method 1000 starts in step 1002 by, based on the computed demand, partitioning higher resource-intensive areas of interest of the at least one portion of the world into a greater number of cells. Then, in step 1004, the method 1000 continues by allocating corresponding resources from the one or more sources to each cell. After ending an event associated to the one or more requests within the higher resource-intensive areas of interest, the method 1000 continues in step 1006 by restoring the resources to the original one or more sources. Finally, in step 1008, the method 1000 ends by consolidating the verse back into the original number of cells.

Figure 11:
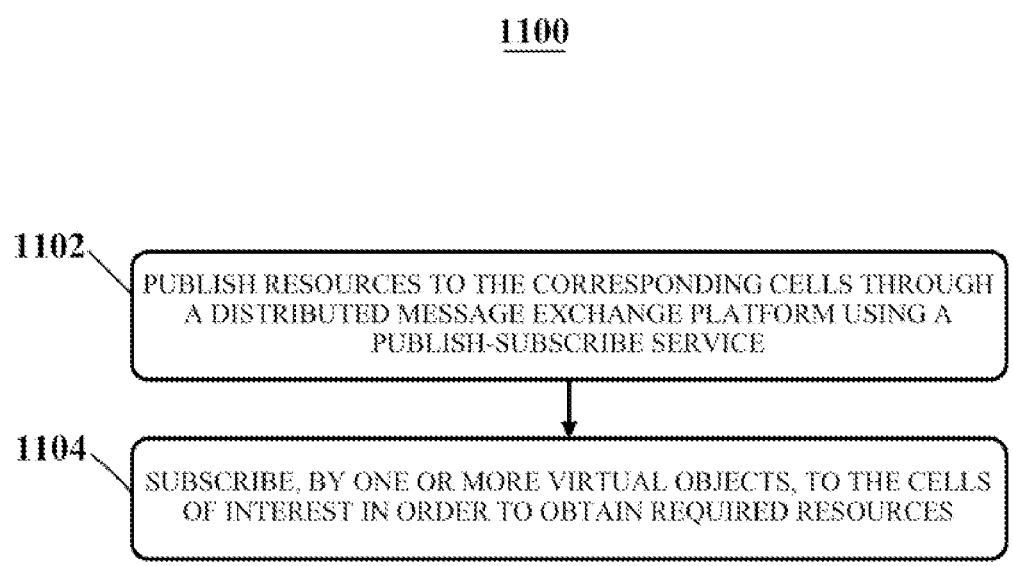
FIG. 11 depicts a block diagram describing resource allocation steps through a distributed message exchange platform, according to an embodiment.

FIG. 11 depicts a block diagram of a method 1100 describing resource allocation steps through a distributed message exchange platform, according to an embodiment.

Method 1100 may start in step 1102 by publishing corresponding resources to the corresponding cells through a distributed message exchange platform of the resource manager using a publish-subscribe model. Then, in step 1104, the method 1100 finishes by subscribing, by the one or more virtual objects, to the cells of interest in order to obtain required resources through the distributed message exchange platform.

In some embodiments, the method 1200 further comprises sharing, through the distributed message exchange platform, the dynamically updated state of the at least one portion of the world with one or more client devices, server computers, or combinations thereof, to which said client devices and/or server computers may subscribe to obtain an updated version of the world. In yet a further embodiment, the state of the at least one portion of the world is obtained by a plurality of connected devices including sensors providing sensor data to the persistent virtual world system, by user input, by server computations, or combinations thereof.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system comprising:
one or more server computers comprising memory and at least one processor, the memory storing:
a data structure virtualizing at least one portion of a virtual or real world into a plurality of cells storing virtual objects forming a persistent virtual world system; and
a distributed 3D engine implemented in a distributed deployment, the distributed 3D engine comprising a resource manager and a plurality of individual distributed software engines;
wherein resources are dynamically allocated via the distributed deployment to the plurality of cells based on a current load and a corresponding computed and ranked demand of individual ones of the plurality of cells, wherein said ranked demand is based on a number of virtual objects within a field of view of a user avatar within an individual cell, and
wherein an original number of the plurality of cells representing areas of interest from the at least one portion of the virtual or real world are further partitioned into a greater number of cells, wherein the resources are restored after ending an event associated with one or more requests, and wherein the at least one portion of the virtual or real world is consolidated back into the original number of cells.

2. The system of claim 1, wherein the ranked demand is further based on distances between client devices accessing the individual cells and network equipment, a type of application being used by users accessing the individual cells, or a type of entitlements of users accessing the individual cells.

3. The system of claim 1, wherein the persistent virtual world system comprises a low fidelity simulation used for demand assessment and load balancing, and a high fidelity simulation used for improving user experience.

4. The system of claim 1, wherein at least some of the virtual objects of the persistent virtual world system comprise self-computing capabilities and autonomous behavior.

5. The system of claim 1, wherein the individual distributed software engines are used sequentially or in parallel, through the distributed deployment, in order to complement engine services of each other for the realization of one or more specific tasks.

6. The system of claim 1, wherein the data structure is an octree data structure, and wherein each cell is represented as a voxel within the octree data structure, wherein the voxel representing the individual cell is selected from among a sparse voxel and a dense voxel based on size of the individual cell.

7. The system of claim 1, wherein the data structure comprises one or more of BSP trees, sparse voxel octrees, 3D arrays, kD trees, point clouds, wire-frames, boundary representations (B-Rep), constructive solid geometry trees (CSG Trees), bintrees, and hexagonal structures.

8. The system of claim 1, wherein the resource manager performs the allocation through a distributed message exchange platform, wherein the distributed message exchange platform utilizes a publish-subscribe model, and wherein one or more virtual objects subscribe to one or more cells where resources are published.

9. The system of claim 8, wherein the distributed message exchange platform shares a dynamically updated state of the at least one portion of the virtual or real world stored in the memory with one or more client devices or servers, and wherein the dynamically updated state is modified through data obtained by one or more of a plurality of connected devices including sensors providing sensor data to the persistent virtual world system, by user input, by server computations, or combinations thereof.

10. The system of claim 1, wherein each cell of the plurality of cells comprises one or more streams, each stream comprising a plurality of stream-specific virtual objects being programmed to be enabled or disabled for viewing and interacting with on client devices, and wherein each stream is associated to one or more applications.

11. A method comprising:
providing, in the memory of at least one server computer, a data structure virtualizing at least one portion of a virtual or real world into a plurality of cells storing virtual objects forming a persistent virtual world system, wherein at least some of the virtual objects are virtual replicas of corresponding real world elements;
providing, in the memory of the at least one server computer, a distributed 3D engine implemented in a distributed deployment, the distributed 3D engine comprising a resource manager and a plurality of individual distributed software engines;
computing, by the resource manager based on a current load, demand of individual ones of the plurality of cells, wherein said demand is based on a number of virtual objects within a field of view of a user avatar within an individual cell;
ranking the individual cells by demand; and
based on the ranked demand, dynamically allocating resources to the individual cells,
wherein an original number of the plurality of cells representing areas of interest from the at least one portion of the virtual or real world are further partitioned into a greater number of cells, wherein the resources are restored after ending an event associated with one or more requests, and wherein the at least one portion of the virtual or real world is consolidated back into the original number of cells.

12. The method of claim 11, wherein the demand is further based on distance between client devices accessing the individual cells and network equipment, a type of application being used by users accessing the individual cells, or a type of entitlements of users accessing the individual cells.

13. The method of claim 11, wherein the persistent virtual world system comprises a low fidelity simulation used for demand assessment and load balancing, and wherein a high fidelity simulation used for improving user experience.

14. The method of claim 11, wherein the individual distributed software engines are used sequentially or in parallel, through the distributed deployment, in order to complement engine services of each other for the realization of one or more specific tasks.

15. The method of claim 11, further comprising providing an octree data structure as the data structure representing the virtual or real world, wherein each cell is represented as a voxel, and wherein the voxel representing the individual cell is selected from among a sparse voxel and a dense voxel based on size of the individual cell.

16. The method of claim 11, further comprising:
partitioning, based on the computed demand, at least one area of interest of the at least one portion of the virtual or real world into additional cells;
allocating corresponding resources to the additional cells.

17. The method of claim 11, wherein said allocation is performed by:
publishing resources to the corresponding cells through a distributed message exchange platform of the resource manager using a publish-subscribe model; and
subscribing, by the one or more virtual objects, to the cells of interest in order to obtain required resources.

18. The method of claim 11, wherein each cell of the plurality of cells comprises one or more streams, each stream comprising a plurality of stream-specific virtual objects and being configured to be enabled or disabled for viewing and interacting with on the client devices, and wherein each stream is associated to one or more user applications.

19. One or more non-transitory computer-readable media having stored thereon instructions configured to, when executed by one or more computers, cause the one or more computers to perform steps comprising:
providing a data structure virtualizing at least one portion of a virtual or real world into a plurality of cells storing virtual objects forming a persistent virtual world system, wherein at least some of the virtual objects are virtual replicas of corresponding real world elements;
providing a distributed 3D engine implemented in a distributed deployment, the distributed 3D engine comprising a resource manager and a plurality of individual distributed software engines;
computing, by the resource manager based on a current load, demand of individual ones of the plurality of cells, wherein said demand is based on a number of virtual objects a field of view of a user avatar within an individual cell;
ranking the individual cells by demand; and
based on the ranked demand, dynamically allocating resources to the individual cells,
wherein an original number of the plurality of cells representing areas of interest from the at least one portion of the virtual or real world are further partitioned into a greater number of cells, wherein the resources are restored after ending an event associated with one or more requests, and wherein the at least one portion of the virtual or real world is consolidated back into the original number of cells.

* * * * *